(12) United States Patent
Fujita et al.

(10) Patent No.: US 7,840,699 B2
(45) Date of Patent: Nov. 23, 2010

(54) NAME RESOLUTION SERVER AND PACKET TRANSFER DEVICE

(75) Inventors: Norihito Fujita, Tokyo (JP); Yuichi Ishikawa, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 1329 days.

(21) Appl. No.: 10/785,191

(22) Filed: Feb. 25, 2004

(65) Prior Publication Data

US 2004/0215707 A1 Oct. 28, 2004

(30) Foreign Application Priority Data

Feb. 28, 2003 (JP) ............................. 2003-054648

(51) Int. Cl.
*G06F 15/173* (2006.01)
(52) U.S. Cl. ..................................... 709/238
(58) Field of Classification Search ................ 709/238, 709/240, 242; 370/231
See application file for complete search history.

(56) References Cited

U.S. PATENT DOCUMENTS

| | | | | |
|---|---|---|---|---|
| 6,892,245 B1 * | 5/2005 | Crump et al. | ................ | 709/245 |
| 7,047,313 B1 * | 5/2006 | Broerman | .................... | 709/238 |
| 7,080,148 B2 * | 7/2006 | Weigand | ..................... | 709/228 |
| 7,103,663 B2 * | 9/2006 | Inoue et al. | .................. | 709/225 |
| 7,228,359 B1 * | 6/2007 | Monteiro | .................... | 709/245 |
| 7,328,281 B2 * | 2/2008 | Takeda et al. | ................ | 709/246 |
| 7,334,048 B1 * | 2/2008 | Guan et al. | .................. | 709/242 |
| 7,334,049 B1 * | 2/2008 | Somasundaram et al. | ... | 709/245 |
| 7,406,538 B2 * | 7/2008 | Berg | .......................... | 709/238 |
| 2002/0035639 A1 * | 3/2002 | Xu | .............................. | 709/238 |

FOREIGN PATENT DOCUMENTS

| | | |
|---|---|---|
| EP | 0817444 A2 | 6/1997 |
| EP | 0944004 A1 | 9/1999 |
| JP | 2001-251341 | 9/2001 |
| JP | 2001-273225 A | 10/2001 |
| JP | 2003-018183 | 1/2003 |

(Continued)

OTHER PUBLICATIONS

Nick Marly, et al., Service Selection in the Access Network, ICC 2001. 2001 IEEE International Conference on Communications, Jun. 11, 2001, pp. 1622-1626,. vol. 5.

(Continued)

*Primary Examiner*—William C Vaughn, Jr.
*Assistant Examiner*—Thomas Richardson
(74) *Attorney, Agent, or Firm*—Foley & Lardner LLP

(57) ABSTRACT

The DNS server according to the present invention includes a user information identification unit which identifies an attribute of a user who has transmitted a DNS query message through a user information obtaining unit and handing over an identification result to a response generation unit, a user information obtaining unit for referring to a user information database to obtain user attribute information of a user who has transmitted a DNS query message, and a response generation unit for searching a response database for a name resolution method relevant to user attribute information handed over from the user information identification unit to conduct name resolution according to the found name resolution method, thereby enabling name resolution to be minutely customized for each attribute of a user.

10 Claims, 23 Drawing Sheets

FOREIGN PATENT DOCUMENTS

| | | |
|---|---|---|
| JP | 2003-032281 | 1/2003 |
| WO | WO 00/27092 | 5/2000 |
| WO | WO 01/26284 A1 | 4/2001 |
| WO | WO 01/41401 A2 | 6/2001 |
| WO | WO 01/61922 | 8/2001 |
| WO | WO 01/61922 A2 | 8/2001 |
| WO | WO 03/027906 A2 | 4/2003 |
| WO | WO 03/01195 A1 | 7/2003 |

OTHER PUBLICATIONS

Nick Marly, et al., Service Selection in the Access Network, ICC 2001. 2001 IEEE International Conference on Communications, Jun. 11, 2001, pp. 1622-1626.

Nick Marly et al., Service Selection in the Access Network, Alcatel Research & Innovation, Francis Wellsplein 1, B-2018 Antwerp, Belgium, 2001 IEEE.

C. Huitema, An Experiment in DNS Based IP Routing, Dec. 1992, p. 1-14.

P. Mockapetris, RFC 1035 Domain Names—Implementation and Specification, Nov. 1987.

Rigney,et al., Remote Authentication Dial in User Service (RADIUS), Jan. 1997, pp. 1-64.

Nick Marly et al., Service Selection in the Access Network, 2001 IEEE, 1622-1626, Antwerp Belgium.

G. Tsirtsis, Network Address Translation—Protocol Translation (NAT-PT), Campio Communications, Feb. 2000, pp. 1-21.

* cited by examiner

| USER IP ADDRESS | LOG-IN ID | KIND OF CONNECTION LINE | NAS ADDRESS | REFERENCE DESTINATION |
|---|---|---|---|---|
| 123.45.0.2 | taro | ADSL | 30.30.30.30 | — |
| 123.45.0.4 | hanako | — | 20.20.20.20 | 8.9.1.4 |
| 123.45.1.0/24 | — | — | — | 9.9.9.9 |
| ... | ... | ... | ... | ... |

| USER ATTRIBUTE | | | | DOMAIN NAME | REFERENCE DESTINATION |
|---|---|---|---|---|---|
| USER IP ADDRESS | USER ID | KIND OF CONNECTION LINE | NAS ADDRESS | | |
| — | — | ADSL | 30.30.30.30 | aaa.com | "adsl_aaa_com.dat" |
| | | | | ... | ... |
| — | — | ISDN | 20.20.20.20 | aaa.com | "isdn_aaa_com.dat" |
| | | | | ... | ... |
| — | jiro | — | — | bbb.com | "jiro_bbb_com.dat" |
| | | | | ... | ... |
| 123.45.1.5 | — | — | — | bbb.com | 1.2.3.4 |
| ... | ... | ... | ... | ... | ... |
| DEFAULT | | | | aaa.com | "aaa_com.dat" |
| | | | | bbb.com | 4.3.2.1 |
| | | | | ccc.com | "ccc_com.dat" |

202 adsl_aaa_com.dat

| TYPE | FQDN | DATA |
|---|---|---|
| A | www.aaa.com | 9.8.7.6 |
| A | mail.aaa.com | 9.8.7.5 |
| CNAME | ftp.aaa.com | adsl_ftp.aaa.com |
| ... | ... | ... |

203 isdn_aaa_com.dat

| TYPE | FQDN | DATA |
|---|---|---|
| A | www.aaa.com | 9.8.7.3 |
| A | mail.aaa.com | 9.8.7.2 |
| CNAME | ftp.aaa.com | isdn_ftp.aaa.com |
| ... | ... | ... |

FIG. 8

301 — USER ATTRIBUTE

| USER IP ADDRESS | USER ID | KIND OF CONNECTION LINE | NAS ADDRESS | DOMAIN NAME | REFERENCE DESTINATION |
|---|---|---|---|---|---|
| — | — | ADSL | 30.30.30.30 | aaa.com | "adsl_aaa_com.dat" |
| | | | | ... | ... |
| — | — | ISDN | 20.20.20.20 | aaa.com | "isdn_aaa_com.dat" |
| | | | | ... | ... |
| — | — | | | user.com | "user_com.dat" |
| | | | | ... | ... |
| DEFAULT | | | | aaa.com | "aaa_com.dat" |
| | | | | bbb.com | 4.3.2.1 |
| | | | | ccc.com | "ccc_com.dat" |
| | | | | ... | ... |

302 — user_com.dat

| TYPE | FQDN | DATA |
|---|---|---|
| TXT | 123-45-0-2.user.com | "login id=taro" access media=ADSL" NAS address=10.10.10.10 |
| TXT | 123-45-0-4.user.com | "login id=hanako" NAS address=20.20.20.20" refer=8.9.1.4" |
| TXT | 123-45-1-0_24.user.com | "refer=9.9.9.9" |
| ... | ... | ... |

| USER ATTRIBUTE ||||  DOMAIN NAME | REFERENCE DESTINATION |
|---|---|---|---|---|---|
| USER ID | KIND OF CONNECTION LINE | GROUP ID | PACKET TRANSFER DEVICE ID | | |
| — | ethernet | silver | switch99 | ddd.com | "sw99_ddd_com.dat" |
|  |  |  |  | ... | ... |
| — | wireless LAN | — | — | ddd.com | "wlan_ddd_com.dat" |
|  |  |  |  | ... | ... |
| hanako | — | — | switch99 | ddd.com | "hanako_ddd_com.dat" |
|  |  |  |  | ... | ... |
| — | — | — | — | ... | ... |
| DEFAULT |||| aaa.com | "aaa_com.dat" |
|  |||| bbb.com | 4.3.2.1 |
|  |||| ccc.com | "ccc_com.dat" |
|  |||| ... | ... |

402 → sw99_ddd_com.dat

| TYPE | FQDN | DATA | ADDITIONAL DATA |
|---|---|---|---|
| A | www.ddd.com | 20.1.1.1 | SrcPAddr=40.1.1.1,vlanID=111,outport=21,priority=0 |
| A | ftp.ddd.com | 30.1.1.1 | SrcPAddr=40.1.1.1,DestIPAddr=50.1.1.1,vlanID=222,outport=21,priority=0 |
| A | host.ddd.com | 40.1.1.1 | — |
| ... | ... | ... | ... |

403 → hanako_ddd_com.dat

| TYPE | FQDN | DATA | ADDITIONAL DATA |
|---|---|---|---|
| A | www.ddd.com | 60.1.1.1 | SrcPAddr=40.1.1.1,DestIPAddr=90.1.1.1,vlanID=333,outport=31,priority=1 |
| A | ftp.ddd.com | 70.1.1.1 | SrcPAddr=50.1.1.1,DestIPAddr=90.1.1.1,vlanID=333,outport=32,priority=1 |
| A | host.ddd.com | 80.1.1.1 | — |
| ... | ... | ... | ... |

| INPUT PORT | SOURCE MAC ADDRESS | USER ID | KIND OF CONNECTION LINE | CONNECTION LINE SPEED | GROUP ID | ... |
|---|---|---|---|---|---|---|
| 02 | 00:12:34:56:78:9a | taro | ethernet | 100Mbps | silver | ... |
| 11 | 00:bc:de:f0:12:34 | hanako | ethernet | 10Mbps | — | ... |
| 12 | 00:56:78:9a:bc:de | pochi | wireless LAN | 10Mbps | silver | ... |
| ... | ... | ... | ... | ... | ... | ... |

| INPUT PACKET INFORMATION | | | | TRANSFER METHOD | | | | |
|---|---|---|---|---|---|---|---|---|
| INPUT PORT | SOURCE MAC ADDRESS | DESTINATION IP ADDRESS | vlan-ID | SOURCE IP ADDRESS | DESTINATION IP ADDRESS | vlan-ID | OUTPUT PORT | PRIORITY |
| 02 | 00:12:34:56:78:9a | 20.1.1.1 | 100 | 40.1.1.1 | − | 111 | 21 | ORDINARY |
| 11 | 00:bc:de:f0:12:34 | 60.1.1.1 | 200 | 40.1.1.1 | 90.1.1.1 | 333 | 31 | HIGH PRIORITY |
| 12 | 00:56:78:9a:bc:de | 40.1.1.1 | − | − | − | 222 | 33 | ORDINARY |
| ... | ... | ... | ... | ... | ... | ... | ... | ... |

NAME RESOLUTION SERVER AND PACKET TRANSFER DEVICE

BACKGROUND OF THE INVENTION

1. Field of the Invention

The present invention relates to a name resolution server and a packet transfer device and, more particularly, to a name resolution server and a packet transfer device which enable customization of a name resolution response based on attribute information of a sender of a name resolution request message.

2. Description of the Related Art

Known as a conventional name resolution server of this kind is a DNS (Domain Name System). The DNS server, as shown in RFC1034, for example, is used in an IP (Internet Protocol) network for making a name resolution mainly from an FQDN (Fully Qualified Domain Name) to an IP address or from an IP address to an FQDN. By sending a DNS query message which is a name resolution request message to a DNS server, a client who requests name resolution makes a request for name resolution and receives a DNS response message as a name resolution response from the DNS server.

When inquired about the same name (FQDN, IP address, etc.), a common DNS server is basically to return the same solution result. (IP address, FQDN, etc.) at any time. In recent years, however, more and more DNS servers have an additional function of returning a different name resolution result according to conditions even when inquired about the same name. In the following, a specific example will be made of the above-described additional function.

First is a function called View of the BIND (Berkeley Internet Name Domain) widely used as server software of a DNS. By using the View, even when inquired about the same name, a DNS server is allowed to change a solution result to be returned to a client according to a source IP address of a DNS query message or an FQDN or an IP address queried by the DNS query message.

In a case, for example, where a source IP address of a DNS query message is a private address, it is possible to return an IP address of a Web server located in an intranet in response to an inquiry about FQDN: www.aaa.com and conversely in a case where a source IP address of the DNS query message is a global IP address, it is possible to return an IP address of a Web server located in an extranet in response to an inquiry about FQDN: www.aaa.com.

There is another case where in a CDN (Content Delivery Network), the above-described additional function of a DNS server is used for the purpose of load distribution of a contents distribution server and improvement of user performance. In a CDN, it is a common practice to arrange one content in a plurality of servers to allot a user's request to an appropriate server in order to distribute loads among servers and to improve user performance. Here, the DNS server is used at the time of selecting a server to which a user's request is to be transmitted.

In a case where for one FQDN, IP addresses of a plurality of contents distribution servers having the same contents are registered in a DNS server, when a client makes an inquiry about the FQDN, the DNS server returns an IP address of an optimum contents distribution server to the client in view of server loads and user performance. Used here as client information is a source IP address of a DNS query message transmitted by a client or a local DNS server (DNS server which receives a DNS query message from a client and is responsible for name resolution processing) in general.

Recited in Japanese Patent Laying-Open (Kokai) No. 2001-273225 (hereinafter referred to as Literature 1) is a method of a DNS server for obtaining, in addition to load conditions of a contents distribution server and location information, not only a source IP address of a DNS query message but also client location information (latitude, longitude, etc.) as information about a client, selecting an optimum server for the client based on these information in response to a DNS query from the client and returning an IP address of the server.

For enabling a DNS server to obtain client's location information, a resolver of the client sends a DNS query message with the client's location information embedded to the DNS server. By receiving the DNS query message with the location information contained, the DNS server is allowed to obtain the location information of the client in question.

First problem of the conventional art is that a DNS server is incapable of customizing name resolution based on various attribute information of a user which has sent a DNS query message. Even if customization is possible, modification of a resolver of the client or that on a node where a DNS query is made is required for embedding various attribute information of the user which has sent the query message into the DNS query message.

Individual users requesting name resolution have a diversity of attributes including, location, favorites, conditions of connection to a using terminal and a network which vary with each user. Customization of name resolution is to change a corresponding name resolution result according to an attribute of a user who has requested name resolution taking such an attribute varying with each user into consideration. Among examples of customization of name resolution are, when making a solution of an IP address corresponding to an FQDN of a server which is distributing moving picture, even with a DNS query having the same FQDN, presenting a solution of an IP address of a server which is conducting distribution in a wide band to a user using an ADSL as a connection line, for example, and conversely presenting a solution of an IP address of a server which is conducting distribution in a narrow band to a user using an ISDN line as a connection line. Customization of name resolution can be realized by making a name resolution further taking more user attribute information into consideration including user's location and favorites and a terminal used.

Conventional DNS servers, however, are allowed to customize name resolution only based on data embedded in a DNS query message. In a common DNS, contained as information about a user in a DNS query message is at most only a source IP address of the DNS query message. Common DNS server is therefore incapable of obtaining other information than a source IP address of a DNS query message. Also with the above-described View function of a BIND, a DNS server is allowed to take only a source IP address of a DNS query message into consideration at the time of name resolution.

When customizing name resolution by using other information than a source IP address of a DNS query message according to conventional art, all the necessary information should be embedded into the DNS query message.

Recited in Literature 1 is a system in which for a DNS server to conduct name resolution based on user's location information, the user's location information is embedded into a DNS query message transmitted by a client. This system, however, has two shortcomings. First is that for embedding information necessary for customization of name resolution into a DNS query message, user's environments including OS and application software used by the user should be changed.

Since currently used resolvers lack in a function of seizing user attribute information and embedding the information into a DNS query message, modification of the resolvers is required. The modification of resolvers of all the users using the DNS server needs enormous costs.

Second is that even when a resolver is changed and user attribute information is embedded into a DNS query message, kinds of user attribute information embedded are fixed to fail to cope with different cases where user attribute information required by a DNS server varies with each DNS server. It is therefore difficult according to the conventional art for a DNS server to obtain user attribute information necessary for customizing name resolution.

Second problem of the conventional art is that a packet transfer device disposed on a path between a DNS server and a client is not allowed to use information (IP address for an FQDN etc.) contained in a DNS response message returned from the DNS server to the client.

Consider a case, for example, where a client connects to a certain Web site. For connecting to the Web site in question, the client first solves an IP address for an FQDN of the Web site in question by using a DNS to connect to the IP address obtained as a result of the solution. In the control related to the connection between the client and the Web site, the DNS server only conducts control of a connection destination, that is, only teaches an IP address of the Web site in question to the client.

Although control related to connection between a client and a Web site further includes control of such a packet transfer method as how to transfer a packet passing on the connection in question (header rewriting, output path control, preferential transfer control, etc.), since the control of the packet transfer methods is realized not by the client but by statically set or dynamically set by a routing protocol or the like on a packet transfer device disposed on a passage between the client and the Web site, a DNS server is not allowed to control these packet transfer methods.

Packet transfer device here represents a total of such devices which conduct packet transfer processing as an Ethernet® switch, an ATM (Asynchronous Transfer Mode) switch, a router, a layer 4 switch and a layer 7 switch.

If a DNS server is allowed to simultaneously conduct both the control of a connection destination at a client and the control of a transfer method at a packet transfer device, the effect of linking two controls will be produced. If in the connection between a client and a Web site as described above, for example, with a client's connection destination as a Web server whose load is the smallest, control, which is to be conducted at a packet transfer device on the way, of preferentially-transferring a packet passing on the connection between the client in question and the Web server in question is executed simultaneously by the DNS server, speed-up of access between the client and the Web site can be effectively realized.

Under these circumstances, however, control of a connection destination at a client and control of a transfer method at a packet transfer device are separately conducted. From the standpoint of the packet transfer device, it is not allowed to use information contained in a DNS response message transmitted by a DNS server to the client, while from the standpoint of the DNS server, it is not allowed to control the transfer method at the packet transfer device by using the DNS response message sent to the client.

SUMMARY OF THE INVENTION

A first object of the present invention is to provide a name resolution server capable of obtaining user attribute information necessary for customizing name resolution and minutely customizing name resolution based on the obtained user attribute information without forcibly changing current user environments (terminal, OS, application software or the like used by the user).

A second object of the present invention is to provide a name resolution server not only capable of dynamically obtaining user attribute information necessary for customization of name resolution and minutely customizing name resolution based on the obtained user attribute information without forcibly changing current user environments (terminal, OS, application software or the like used by the user) but also having a function of dynamically obtaining the user attribute information and managing the same.

A third object of the present invention is to provide a name resolution server capable of controlling both a connection destination at a client and a packet transfer method at a packet transfer device.

A fourth object of the present invention is to provide a packet transfer device enabling control of a packet transfer method by a name resolution message sent and received between a client and a name resolution server.

According to the first aspect of the invention, a name resolution server which conducts name resolution with respect to a received name resolution request message and returning a result of the name resolution by a name resolution response message, which obtains, based on information contained in the name resolution request message, attribute information regarding a user as a sender which is not contained in the name resolution request message to conduct the name resolution based on the attribute information.

According to another aspect of the invention, a name resolution server which conducts name resolution with respect to a received name resolution request message and returning a result of the name resolution by a name resolution response message, comprises a user information obtaining unit which obtains, as attribute information regarding a user as a sender of the received name resolution request message, the attribute information other than information contained in the name resolution request message, and a response generation unit which conducts the name resolution by using the attribute information obtained by the user information obtaining unit to generate a name resolution response message.

According to another aspect of the invention, a packet transfer device which transfers a received packet to other node, wherein control of a packet transfer method as a method of transferring the received packet to the other node is conducted based on information contained in a name resolution response message transmitted from a name resolution server to a client.

According to another aspect of the invention, a packet transfer device which transfers a received packet to other node, comprises a DNS proxy unit which once receives a name resolution response message transmitted from a name resolution server to a client and rewrites the contents of a routing table in which a packet transfer method as a method of transferring the received packet to the other node is held based on information contained in the name resolution response message.

According to another aspect of the invention, a packet transfer device which transfers a received packet to other node, comprises a user information obtaining unit which obtains attribute information regarding a user as a sender of a name resolution request message transmitted from a client to a name resolution server, and a DNS proxy unit which once receives the name resolution request message, obtains attribute information regarding the user of the name resolution request message through the user information obtaining unit and adding the attribute information to the name resolution request message to transmit the name resolution request message obtained to the name resolution server.

According to another aspect of the invention, a name resolution server which conducts name resolution with respect to a received name resolution request message and returns a result of the name resolution by a name resolution response message, wherein the name resolution response message contains a packet transfer method at a packet transfer device.

According to another aspect of the invention, a name resolution program operable on a name resolution server which executes processing of conducting name resolution with respect to a received name resolution request message and returning a result of the name resolution by a name resolution response message, comprises a function of obtaining, based on information contained in the name resolution request message, attribute information regarding a user as a sender which is not contained in the name resolution request message to conduct the name resolution based on the attribute information.

According to another aspect of the invention, a name resolution program operable on a name resolution server which executes processing of conducting name resolution with respect to a received name resolution request message and returning a result of the name resolution by a name resolution response message, comprises a user information obtaining function of obtaining, as attribute information regarding a user as a sender of the received name resolution request message, the attribute information other than information contained in the name resolution request message, and a response generation function of conducting the name resolution by using the attribute information obtained by the user information obtaining function to generate a name resolution response message.

According to another aspect of the invention, a packet transfer program operable on a packet transfer device which conducts processing of transferring a received packet to other node, comprises a function of conducting control of a packet transfer method as a, method of transferring the received packet to the other node based on information contained in a name resolution response message transmitted from a name resolution server to a client.

According to another aspect of the invention, a packet transfer program operable on a packet transfer device which conducts processing of transferring a received packet to other node, comprises a DNS proxy function of once receiving a name resolution response message transmitted from a name resolution server to a client and rewriting the contents of a routing table in which a packet transfer method as a method of transferring the received packet to the other node is held based on information contained in the name resolution response message.

According to another aspect of the invention, a packet transfer program operable on a packet transfer device which conducts processing of transferring a received packet to other node, comprises a user information obtaining function of obtaining attribute information regarding a user as a sender of a name resolution request message transmitted from a client to a name resolution server, wherein a DNS proxy function is executed of once receiving the name resolution request message, obtaining attribute information regarding the user of the name resolution request message through the user information obtaining function and adding the attribute information to the name resolution request message to transmit the name resolution request message obtained to the name resolution server.

According to another aspect of the invention, a name resolution method by a name resolution server which executes processing of conducting name resolution with respect to a received name resolution request message and returning a result of the name resolution by a name resolution response message, comprises the step of obtaining, based on information contained in the name resolution request message, attribute information regarding a user as a sender which is not contained in the name resolution request message to conduct the name resolution based on the attribute information.

According to another aspect of the invention, a name resolution method by a name resolution server which executes processing of conducting name resolution with respect to a received name resolution request message and returning a result of the name resolution by a name resolution response message, comprises the steps of obtaining, as attribute information regarding a user as a sender of the received name resolution request message, the attribute information other than information contained in the name resolution request message, and conducting the name resolution by using the attribute information obtained to generate a name resolution response message.

According to another aspect of the invention, a packet transfer method which conducts processing of transferring a received packet to other node, comprises the step of conducting control of the packet transfer method as a method of transferring the received packet to the other node based on information contained in a name resolution response message transmitted from a name resolution server to a client.

According to another aspect of the invention, a packet transfer method which conducts processing of transferring a received packet to other node, comprises the step of once receiving a name resolution response message transmitted from a name resolution server to a client and rewriting the contents of a routing table in which the packet transfer method as a method of transferring the received packet to the other node is held based on information contained in the name resolution response message.

According to another aspect of the invention, a packet transfer method which conducts processing of transferring a received packet to other node, comprising the steps of obtaining attribute information regarding a user as a sender of a name resolution request message transmitted from a client to a name resolution server, and once receiving the name resolution request message, obtaining attribute information regarding the user of the name resolution request message by the user information obtaining function and adding the attribute information to the name resolution request message to transmit the name resolution request message obtained to the name resolution server.

The first name resolution server according to the present invention includes a user information obtaining unit for obtaining attribute information of a user who has sent a name resolution request message by referring to a user information database in which the attribute information of the user who has sent the name resolution request message is registered and a response generation unit for minutely customizing name resolution based on the obtained attribute information. Since adopting such a structure enables the first name resolution server of the present invention to customize name resolution by using attribute information of the message sender not contained in the received name resolution request message, no client needs to contain attribute information necessary for the name resolution server to customize name resolution into the message in question. In other words, customization of name resolution based on various attribute information is possible at the name resolution server without the need of changing the current user environments (terminal, OS, application software or the like used by the user). Therefore, the first object of the present invention can be attained.

The second name resolution server according to the present invention includes a user information management unit in addition to the components of the first name resolution server of the present invention. The user information management unit has an authentication information obtaining unit for obtaining attribute information and information about log-in statuses collected by an authentication server from the authentication server and a user information updating unit for dynamically registering attribute information at a user information database or dynamically deleting the attribute information from the user information database based on the obtained attribute information and information about the log-in statuses. Adopting such a structure to automatically conduct registration or deletion of attribute information to be referred to at the time of name resolution at or from the user information database attains the second object of the present invention.

The third name resolution server according to the present invention includes a response generation unit for referring to a response database in which both a connection destination corresponding to a name and a method of transferring a packet to the connection destination in question are registered to generate a name resolution response message containing both a connection destination corresponding to a name inquired by a name resolution request message and a method of transferring a packet to the connection destination in question. With such a structure, at the reception of a name resolution request message, sending to a client a name resolution response message containing both a connection destination corresponding to an inquired name and a method of transferring a packet to the connection destination in question enables the packet transfer device of the present invention to use the packet transfer method contained in the name resolution response message. As a result, the third object of the present invention can be attained.

The packet transfer device of the present invention includes a user information obtaining unit for obtaining attribute information of a user who has transmitted a name resolution request message and a DNS proxy unit for embedding attribute information obtained by the user information obtaining unit into a name resolution request message and then extracting a packet transfer method from a name resolution response message transmitted by the second name resolution server of the prevent invention to store the obtained information in a routing table. With such a structure adopted, at the time of transferring a packet, referring to the packet transfer method extracted from the name resolution response message transmitted by the second name resolution server of the present invention attains the fourth object.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing an example of a response database according to the first embodiment of the present invention;

FIG. 8 is a diagram showing an example of the response database in which user attribute information is registered in the first embodiment of the present invention;

FIG. 15 is a diagram showing an example of a response database according to the third embodiment of the present invention;

FIG. 16 is a diagram showing an example of a user information database according to the third embodiment of the present invention;

FIG. 17 is a diagram showing an example of a routing table of the third embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Next, embodiments of the present invention will be described in detail with reference to the drawings.

Figure 1:
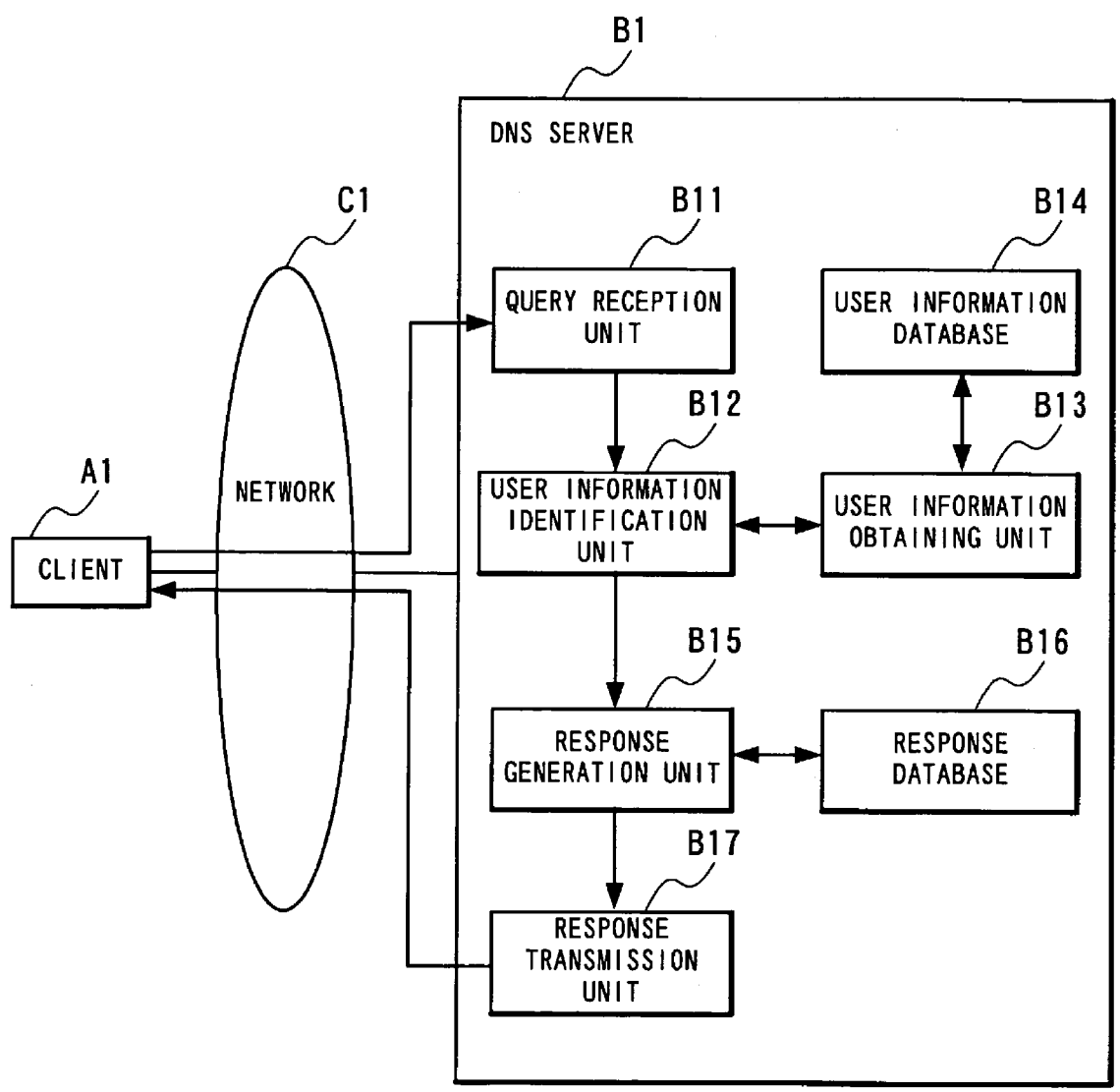
FIG. 1 is a block diagram showing a structure of a first embodiment of the present invention.

With reference to FIG. 1, the first embodiment of the present invention is realized by a client A1 and a DNS server B1 as a name resolution server. The client A1 and the DNS server B1 are connected through a network C1. The DNS server B1 can be generalized not only as a server having a name resolution function in a DNS but also as a name resolution function in other uses. Among servers having a name resolution function in other uses are a WINS (Windows® Internet Name Service) server and an NIS (Network Information Service) server. In the following, the description will be made of a case where the DNS server is used as a server having a name resolution function.

The client A1 transmits a DNS query message as a name resolution request message to the DNS server B1 for making a solution of an IP address corresponding to such an FQDN of a node on the network as [www.biglobe.ne.jp] or [ftp.nec-.com] or conversely making a solution of an FQDN corresponding to a certain IP address. Other purposes of using the DNS server B1 by the client A1 are, for example, a solution of a host and a port number which present service corresponding to a service name such as ftp or http as recited in RFC2782 and a solution of a URI (Universal Resource Identifier) corresponding to a telephone number as recited in RFC2916. In the following, the description will be made mainly of a case where the DNS server B1 makes a solution of an IP address from an FQDN or an FQDN from an IP address.

In response to the transmitted DNS query message, the client A1 receives a DNS response message as a name resolution response message returned from the DNS server B1. The DNS response message contains the result of the name resolution.

While a terminal node (user terminal) such as a PC (Personal Computer), a portable terminal or a work station is in general named as an example of the client A1, since there is a case where other DNS server than the DNS server B1 makes a recursive DNS query to the DNS server B1 in order to make some name resolution, such a DNS server can be also considered as the client A1.

The DNS server B1 includes a query reception unit B11, a user information identification unit B12, a user information obtaining unit B13, a user information database B14, a response generation unit B15, a response database B16 and a response transmission unit B17.

The DNS server B1 is largely different from a structure of a conventional DNS server in newly including the user information identification unit B12, the user information obtaining unit B13 and the user information database B14.

The query reception unit B11 receives a DNS query message sent by the client A1 and hands over the same to the user information identification unit B12.

Upon receiving the DNS query message, the user information identification unit B12 checks whether user attribute information of a user as a sender of the message is contained in the message in question and when contained, reads the user attribute information and identifies the same. If the information is not contained, conduct processing of obtaining the user attribute information of the sender of the DNS query message from the user information database B14 through the user information obtaining unit B13.

When the user attribute information is obtained, the user information identification unit B12 hands over the user attribute information and the DNS query message to the response generation unit B15. When not obtaining the user attribute information, hand over only the DNS query message to the response generation unit B15.

Here, the user attribute information represents a total of information about a user including, for example, a user ID of the user (client A1), location information, information about favorites such as hobbies and an activity history, a kind of user terminal such as a cellular phone, a PDA (Personal Digital Assistants) or a notebook computer, information about a user terminal such as an OS (Operating System) installed in the user terminal, mounted network interface, CPU speed and memory, and information about conditions of connection to a network including an IP address and a MAC address of a user terminal, a kind of connection line such as ADSL (Asymmetric Digital Subscriber Line) or ISDN (Integrated Services Digital Network), a connection line speed and an IP address of a connected NAS (Network Access Server).

When the user attribute information of the sender of the message in question is not contained in the DNS query message received by the DNS server B1, the user information obtaining unit B13 obtains the user attribute information in question from the user information database B14 based on the information (a source IP address or a source MAC address of the message in question) handed over from the user information identification unit B12 and hands over the same to the user information identification unit B12.

Registered at the user information database B14 are user attribute information of a user who needs a name resolution from the DNS server B1 and a reference destination for obtaining user attribute information. In the user information database B14, arbitrary user attribute information can be registered as required.

Figure 2:
FIG. 2 is a diagram showing an example of a user information database according to the first embodiment of the present invention.

Example of contents of the user information database B14 is shown in FIG. 2. Registered in the user information database B14 in FIG. 2 are a log-in ID for a network operated by an ISP (Internet Service Provider), an IP address of a user terminal, a kind of connection line, an IP address of a connected NAS and a reference destination for obtaining user attribute information which is not registered in the user information database B14 but can be obtained from an external server.

In FIG. 2, [-] represents that the contents of a relevant item are not registered in the user information database B14. In the first entry, for example, [-] indicated in the reference destination represents that as to a user whose attribute information is registered in this entry, a reference destination for obtaining further attribute information is unclear or fails to exist. In the second entry, it is indicated that a kind of connection line is unclear and that as to user attribute information not registered, acquisition is possible by referring to a node designated by an IP address [8.9.1.4] registered in the reference destination. Indicated in the third entry is that attribute information of a user whose user terminal IP address is within the range of 123.45.1.0/24] can be obtained by referring to a node designated by an IP address [9.9.9.9].

The response generation unit B15 conducts name resolution processing of an IP address from an FQDN requested by the DNS query message or an FQDN from an IP address with reference to the response database B16. When user attribute information is handed over from the user information identification unit B12 together with the DNS query message, conduct name resolution processing taking the user attribute information into consideration. When a user makes a request for name resolution of an IP address from an FQDN of a server which is delivering moving picture, even if it is a DNS query for the same FQDN, taking the user attribute information into consideration enables customization of name resolution processing for each user such as enabling a user whose connection line is an ADSL, for example, to have a solution of an IP address of a server conducting distribution in a wide band and a user whose connection line is an ISDN to have a solution of an IP address of a server conducting distribution in a narrow band.

Registered in the response database B16 are entries indicating a solution method from an FQDN to an IP address or from an IP address to an FQDN for each user's attribute. Also registered is a method of name resolution of a default independent of user attribute information.

Example of the response database B16 is shown in FIG. 3. The response database B16 shown in FIG. 3 is formed of two kinds of tables. One is a table (zone file) where a specific method of a name resolution from an FQDN to an IP address or the like is registered, to which zone files 202 and 203 correspond. Main information registered at the zone files 202 and 203 are TYPE indicative of a kind of entry, FQDN as a key to name resolution and DATA indicative of data responding as a result of name resolution. As examples of TYPE for use are an A record indicative of a solution of an IP address corresponding to a certain FQDN, an MX record indicative of a solution of an address of a mail server corresponding to a certain FQDN and a CNAME record indicative of another name of a certain FQDN. Here, with reference to a first entry of the zone file 202, it is found that a kind of the entry (TYPE) is an A record indicative of a solution of an IP address from an FQDN and that an IP address (DATA) corresponding to FQDN:www.aaa.com is [9.8.7.6].

Another is a table (name resolution table) in which user attribute information and a reference destination of a name resolution method for each domain space are registered, which corresponds to a name resolution table 201. A reference destination of a name resolution method is registered at the name resolution table 201 for each combination of user attribute information such as a user IP address, a user ID, a kind of connection line and an IP address of a NAS.

In the name resolution table 201, [-] indicates user attribute information which will not be taken into consideration at the time of name resolution. In the first entry, for example, among the user attribute information, neither a user IP address nor a user ID is taken into consideration but only a kind of connection line and an NAS address will be considered. The first entry indicates that with a user IP address and a user ID being arbitrary and a connection line being an ADSL, when a user whose IP address of a connected NAS is [30.30.30.30] inquires about an FQDN belonging to a domain space aaa-.com, a zone file adsl_aaa_com.dat (zone file 202) will be referred to. Similarly, the third entry indicates that among the user arbitrary information, with a user IP address, a kind of access line and an IP address of an NAS being arbitrary, when a user whose user ID is [jiro] inquires about an FQDN belonging to a domain space bbb.com, a zone file jiro_bbb_com.dat will be referred to. In addition, the fourth entry indicates that when a DNS query of an FQDN belonging to the domain space bbb.com is made from an IP address [123.45.1.5], name resolution processing is conducted at other DNS server designated by an IP address [1.2.3.4].

In the last entry (DEFAULT), registered is a solution method of an IP address of a default independent of user attribute information. The entry will be referred to when the user attribute information corresponds to none of the user attribute information registered in the name resolution table 201 or when user attribute information corresponding to a DNS query message can not be obtained by the user information identification unit B12.

The response transmission unit B17 generates a DNS response message based on a result of the name resolution processing handed over from the response generation unit B15 and transmits the same to the client A1.

Next, with reference to FIG. 4, detailed description will be made of operation of the DNS server B1 from reception of a DNS query message to transmission of a response message in the present embodiment.

Upon receiving a DNS query message from the client A1 (Step S101 in FIG. 4), the query reception unit B11 hands over the message to the user information identification unit B12.

Upon receiving the DNS query message, the user information identification unit B12 conducts processing of obtaining user attribute information of a sender of the message in question (Step S102).

Here, with reference to FIG. 5, detailed description will be made of the processing of obtaining user attribute information conducted at Step S102.

Figure 5:
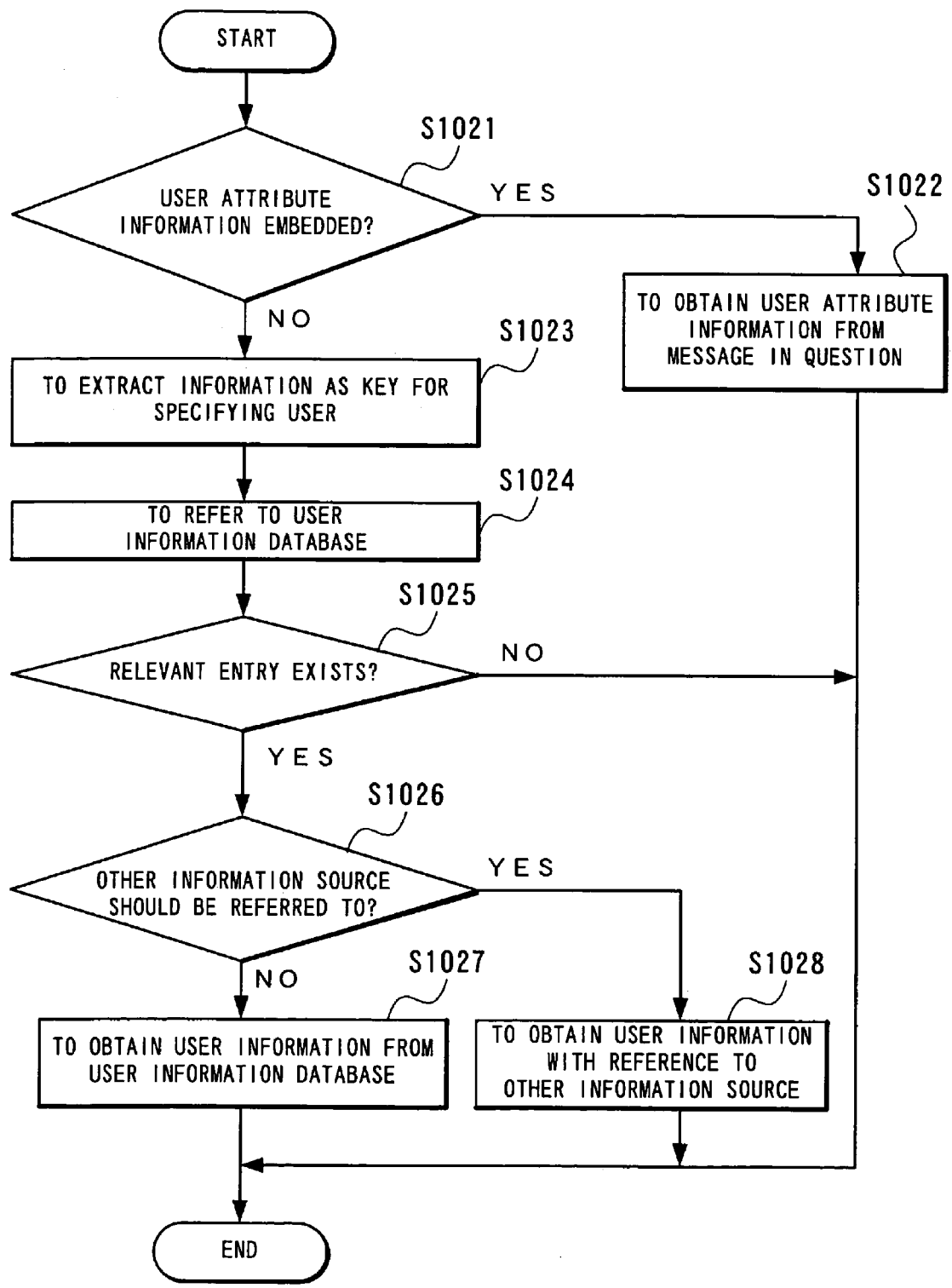
FIG. 5 is a flow chart showing operation of obtaining user attribute information by the DNS server according to the first embodiment of the present invention.

First, the user information identification unit B12 determines whether user attribute information is embedded in a received DNS query message or not (Step S1021 in FIG. 5). When the user attribute information is embedded, read and obtain the information (Ste S1022) to end the user attribute information obtaining processing.

When the determination is made that no user attribute information is embedded at Step S1021, the received DNS query message is handed over from the user information identification unit B12 to the user information obtaining unit B13, so that the user information obtaining unit B13 extracts information as a key to specify a user who has sent the message in question (Step S1023). One of examples of information as a key for extraction is a source IP address of the DNS query message. This is because when the client A1 is a resolver of a user using terminal, a source IP address of a DNS query message is an IP address of the terminal used by the user. On the other hand, when the client A1 is a resolver of a user using terminal and the client A1 and the DNS server B1 are directly connected without using a router, a source MAC address of the client A1 can be similarly used as a key to specify a user who has sent the DNS query message.

Next, the user information obtaining unit B13 searches the user information database B14 for an entry relevant to the information extracted at Step S1023 (Step S1024).

When at Step S1024, no relevant entry exists, the obtaining processing of Step S103 ends (Step S1025).

When at Step S1024, a relevant entry exists, the user information obtaining unit B13 determines based on the contents of the relevant entry whether user attribute information should be obtained by referring to other information source than the local user information database B14 (Steps S1025 and S1026). When the determination is made that it is not necessary to obtain the user attribute information by referring to other information source than the local user information database B14, the user information obtaining unit B13 obtains user attribute information from an entry found at Step S1025 (Step S1027).

When the determination is made that the user attribute information should be obtained by referring to other information source, the user information obtaining unit B13 conducts, in addition to the processing of obtaining user attribute information from the entry found at Step S1025, processing of obtaining user attribute information further with reference to other information source than the user information database B14 (Step S1028).

In the foregoing processing, determination whether the information should be obtained with reference to other information source than the local user information database B14 is made by whether a reference destination such as an external server is registered in the user information database B14.

Examples of Steps S1025 to S1028 will be described with respect to a case, for example, where the user information database B14 has the contents shown in FIG. 2. Extract a source IP address as information as a key to specify a user from the DNS query message and when the IP address is [123.45.0.2], the user information obtaining unit B13 searches the user information database B14 for an entry in which the IP address is [123.45.0.2] (Step S1025). Since an entry found in this case is the first entry and its reference destination is [-], the user information obtaining unit B13 determines to obtain the information by referring only to the user information database B14 without referring to other node (external server etc.) (Step S1026) and obtains the user attribute information indicated in the first entry (Step S1027).

When the source IP address of the DNS query message is [123.45.0.4], the second entry will be found. Since registered in its reference destination is an IP address of a node as the reference destination, the user information obtaining unit B13 determines that other node should be referred to (Step S1026) to obtain user attribute information registered in the second entry, as well as obtaining user attribute information also from a database of user attribute information held by the node of the registered IP address (Step S1028).

Figure 4:
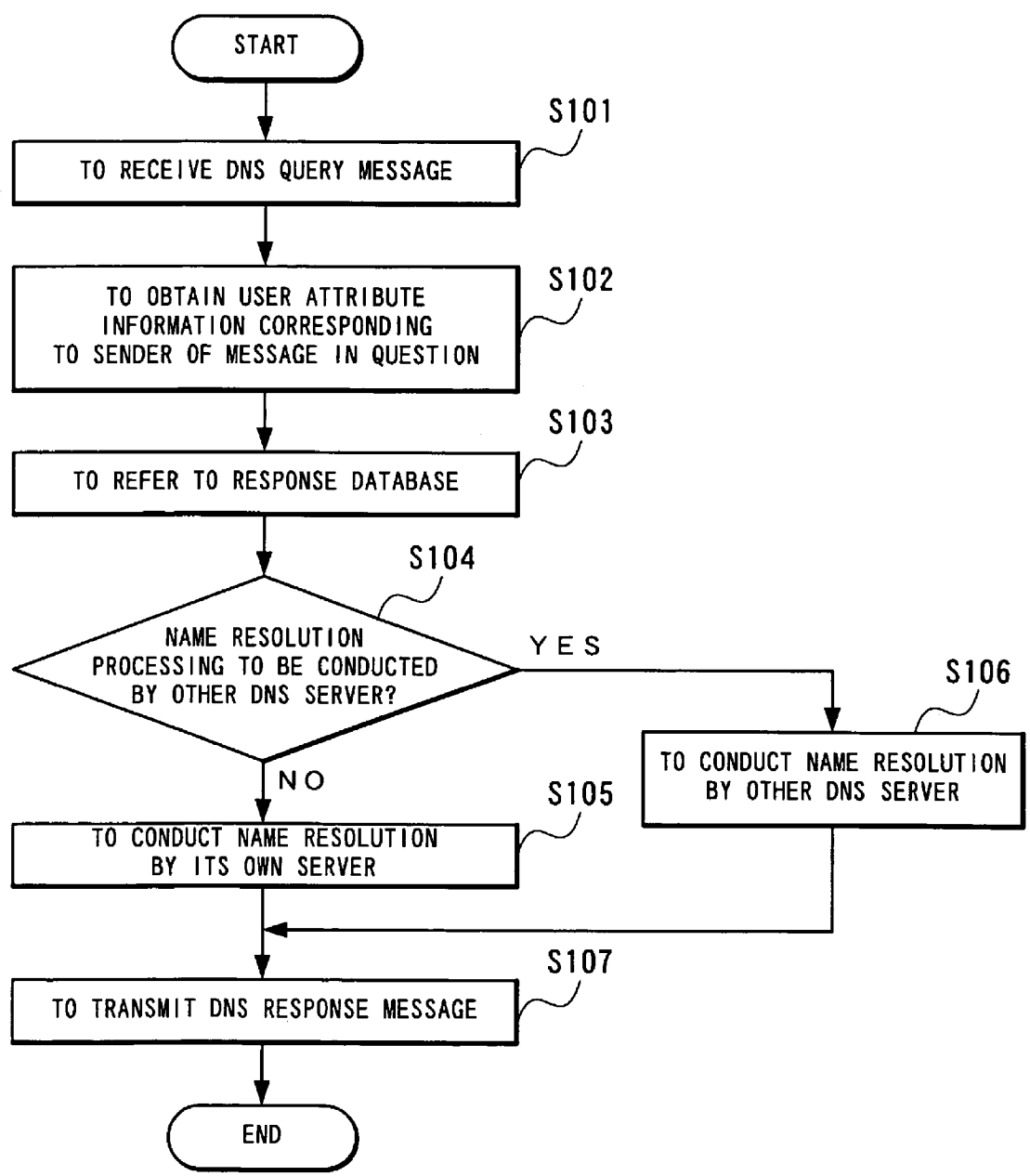
FIG. 4 is a flow chart showing operation of a DNS server according to the first embodiment of the present invention.

Back to the description of the flow chart shown in FIG. 4. After the user attribute information obtaining processing at Step S102, the user information identification unit B12 hands over the DNS query message received by the DNS server B1 and the user attribute information of the message sender in question together to the response generation unit B15. When the user attribute information of the message sender could not be obtained at Step S102, handle the message in question considering that no corresponding user attribute information exists and hand over only the DNS query message in question to the response generation unit B15.

When handed over the DNS query message and its corresponding user attribute information together, the response generation unit B15 searches for an FQDN or an IP address inquired by the DNS query message and an entry relevant to the user attribute information with reference to the response database B16 (Step S103). When receiving only the DNS query message, search for an entry of a default relevant to the FQDN or the IP address inquired by the received DNS query message with reference to the response database B16 (Step S103).

The response generation unit B15 determines based on the contents of the searched entry whether name resolution should be conducted by other DNS server (Step S104). Determination is here made that name resolution should be conducted by other DNS server when an address of other DNS server is registered as a reference destination of the name resolution table 201 in the response database B16 shown in FIG. 3.

When the determination is made at Step S104 that name resolution should be made by other DNS server, conduct processing to make the name resolution processing be executed by other DNS server (Step S106). The following two methods are among examples of a method of making the name resolution processing be executed by other DNS server.

First is a method of transferring both of the user attribute information and the DNS query message handed over from the user information identification unit B12 or only the DNS query message to other DNS server. Structure of the response generation unit B15 in a case where this method is adopted is shown in FIG. 6.

Figure 6:
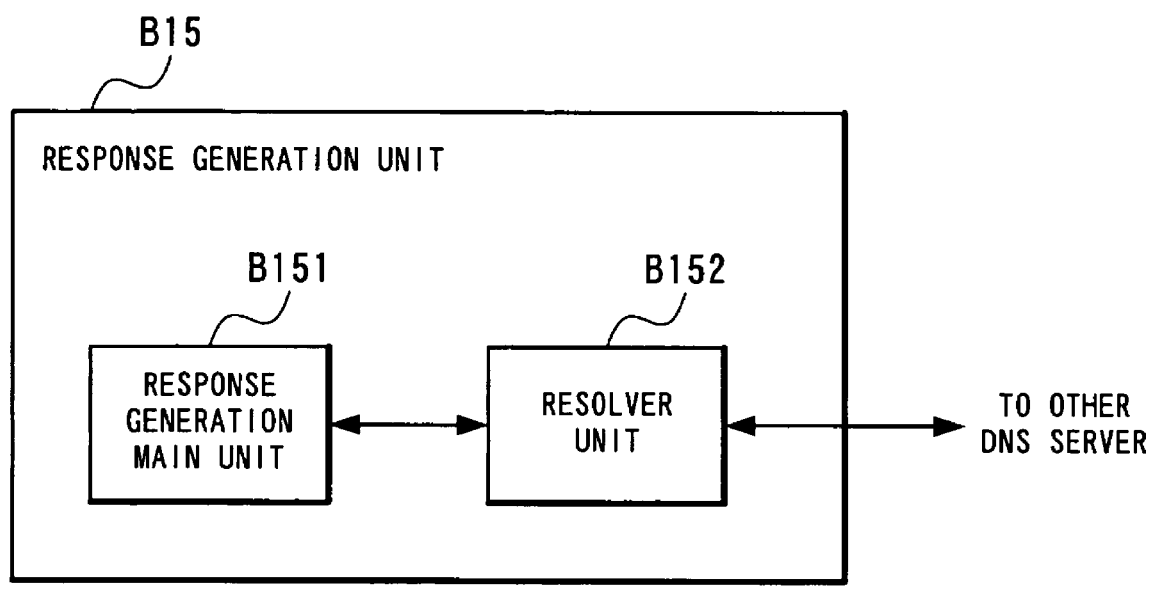
FIG. 6 is a block diagram showing a structure of a response generation unit in the DNS server according to the first embodiment of the present invention.

With reference to FIG. 6, the response generation unit B15 includes a response generation main unit B151 and a resolver unit B152. The response generation main unit B151 conducts the above-described processing of Steps S103 and S104 and when the determination is made at Step S104 that the name resolution should be executed by other DNS server, hands over both of the user attribute information and the DNS query message handed over from the user information identification unit B12 or only the DNS query message to the resolver unit B152 and further notifies the unit B152 of other DNS server which should execute name resolution. Based on the information handed over from the response generation main unit B151, the resolver unit B152 transfers both of the user attribute information and the DNS query message or only the DNS query message.

Possible method of transferring both the user attribute information and the DNS query message to other DNS server by the resolver unit B152 is, for example, setting up a DNS query message according to a format of a DNS message and transmitting the message with user attribute information embedded. Field called an additional information part for embedding additional information is prepared in the DNS message format, so that arbitrary information can be embedded into the additional information part in the form of a DNS resource record.

In this method, encode the received user attribute information into the format of a resource record and embed the encoded information into the additional information part of the DNS query message to transfer the obtained message to other DNS server (Step S106). Then, upon receiving, from other DNS server to which the DNS query message has been transferred, the corresponding DNS response message, the resolver unit B152 transfers the message to the response transmission unit B17, so that the response transmission unit B17 transfers the response message in question to the client A1 (Step S107).

Since this transfer method enables a DNS query message with user attribute information embedded to be processed at a conventional DNS server, the DNS server B1 of the present invention and other conventional DNS servers can be used together.

Second is a method in which a message notifying that name resolution should be conducted at other DNS server is returned as a DNS response message to the client A1 and the client A1 having received the notice newly transmits a DNS query message to other DNS server. In this case, the response transmission unit B17 transmits, to the client A1, a DNS response message containing an IP address of other DNS server to which the client A1 should newly send the DNS query message (Step S107).

On the other hand, when the response generation unit B15 determines at Step S104 that name resolution should be done at its own server, conduct the name resolution from an FQDN to an IP address or from an IP address to an FQDN according to the contents of the searched entry (Step S105) to hand over the result to the response transmission unit B17.

The response transmission unit B17 generates a DNS response message based on the received name resolution result and transmits the same to the client A1 (Step S107).

In the foregoing description of the first embodiment, the DNS server B1 is assumed to include the user information database B14 as its component. In other possible structure, the user information database B14 is held not in the DNS server B1 but in another server. The structure obtained in such a case is shown in FIG. 7 as another example of the first embodiment.

In this example, unlike the above-described structure shown in FIG. 1, a DNS server B2 not including the user information database B14 is used in place of the above-described DNS server B1 and a database server D1 including a user information database D11 as its component is used.

Figure 7:
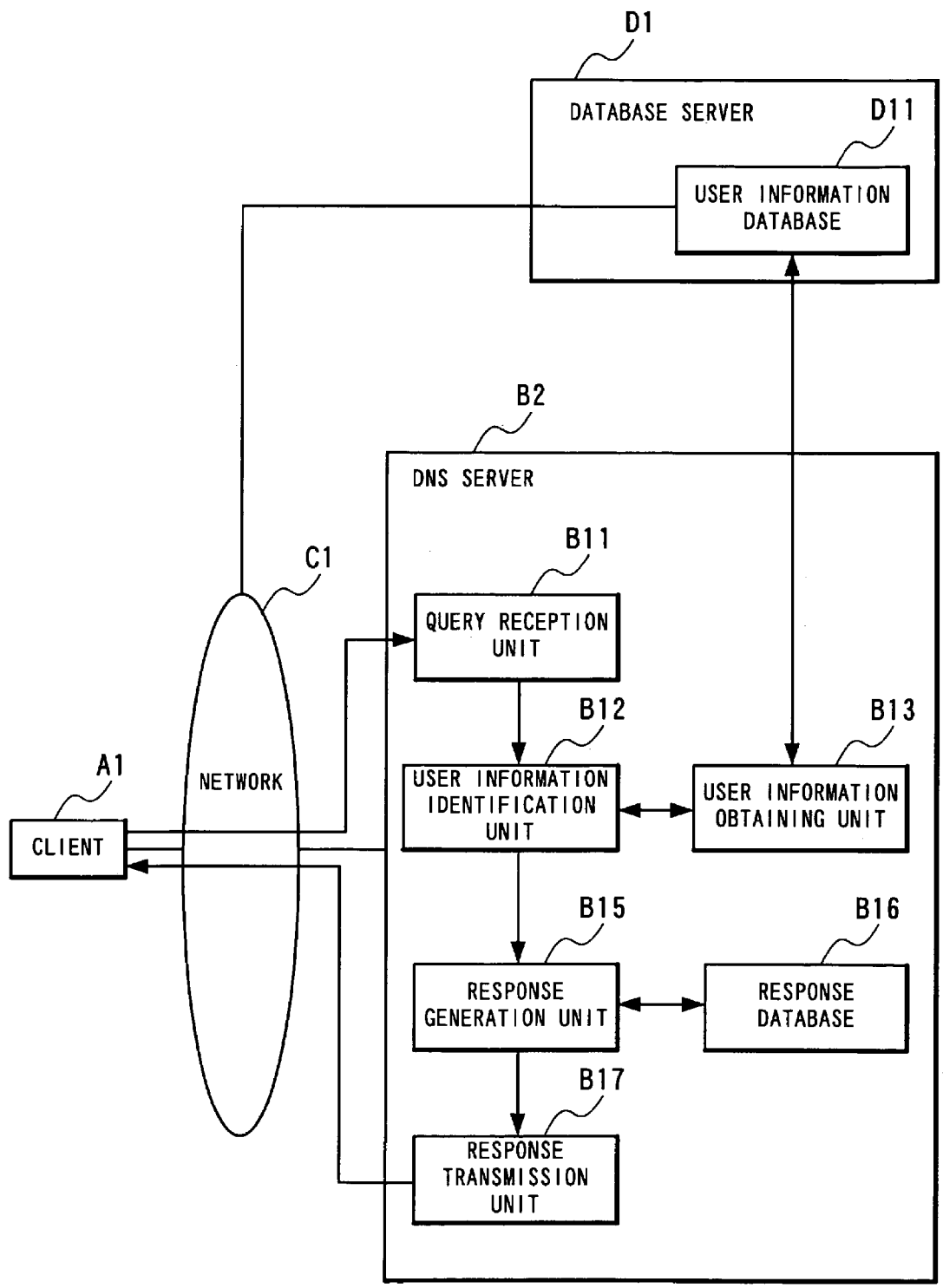
FIG. 7 is a block diagram showing a structure in which the user information database is held by a database server according to the first embodiment of the present invention.

Operation of the DNS server B2 executed in the structure shown in FIG. 7 can be considered the same as the above-described operation of the DNS server B1 by replacing the user information database B14 with the user information database D11.

Function of the database server D1 can be realized by a dedicated node and also as one function of other DNS server B1 or B2. In the latter case, the user information database D11 will be managed as the response database B16, and the user information obtaining unit B13 will obtain user attribute information by using a DNS message for other DNS server B1 or B2 in question.

Example of contents of the response database B16 in this case is shown in FIG. 8. A name resolution table 301 illustrated in FIG. 8 adopts the same format as that of the name resolution table 201 shown in FIG. 3, in which user attribute information can be obtained by referring to the third entry. The third entry indicates that user attribute information is stored in a file user_com.dat (zone file 302). Stored in the zone file 302 is the same user attribute information as that stored in the user information database B14 shown in FIG. 2, which information is stored in the form of a TXT record as one kind of DNS resource records, with an FQDN containing an IP address of a user using terminal as a key.

It is found, for example, from the first entry of the zone file 302 that user attribute information of a user whose IP address of its using terminal is [123.45.0.2] includes taro as a log-in ID (login id taro), ADSL as a kind of connection line (access media=ADSL) and [30.30.30.30] (NAS address=30.30.30.30) as an IP address of a connected NAS. When user attribute information of a user whose IP address of its using terminal is [123.45.0.2] needs to be obtained, the user information obtaining unit B13 transmits a DNS query message requesting a TXT record whose domain name is [123.45.0.2. user.com] to the database server D1.

Next, effects of the first embodiment will be described.

In this embodiment, customization of name resolution processing taking user attribute information into consideration is realized by the reference by the DNS server B1 to the user information database B14 in which user attribute information is managed. Registration of user attribute information in the user information database B14 in advance enables the DNS server B1 to conduct name resolution processing in consideration of arbitrary user attribute information by referring to the user information database B14.

As described in the foregoing, according to the conventional art, a DNS server is allowed to use, as attribute information regarding a user, only a source IP address of a received DNS query message. In a case of using other attribute information as well, it is necessary to embed all the necessary attribute information into a DNS query message sent by a client and a resolver should be changed at the client.

In the present embodiment, referring to the user information database B14 by the DNS server B1 eliminates the need of change of a resolver at a client. A case where user attribute information to be considered differs in kind with each DNS server, which case is hard to be handled by the conventional art, can be flexibly coped with by the present embodiment with ease only by changing a kind of user attribute information registered in the user information database B14 according to each DNS server.

Next, second embodiment of the present invention will be described in detail with reference to the drawings.

Figure 9:
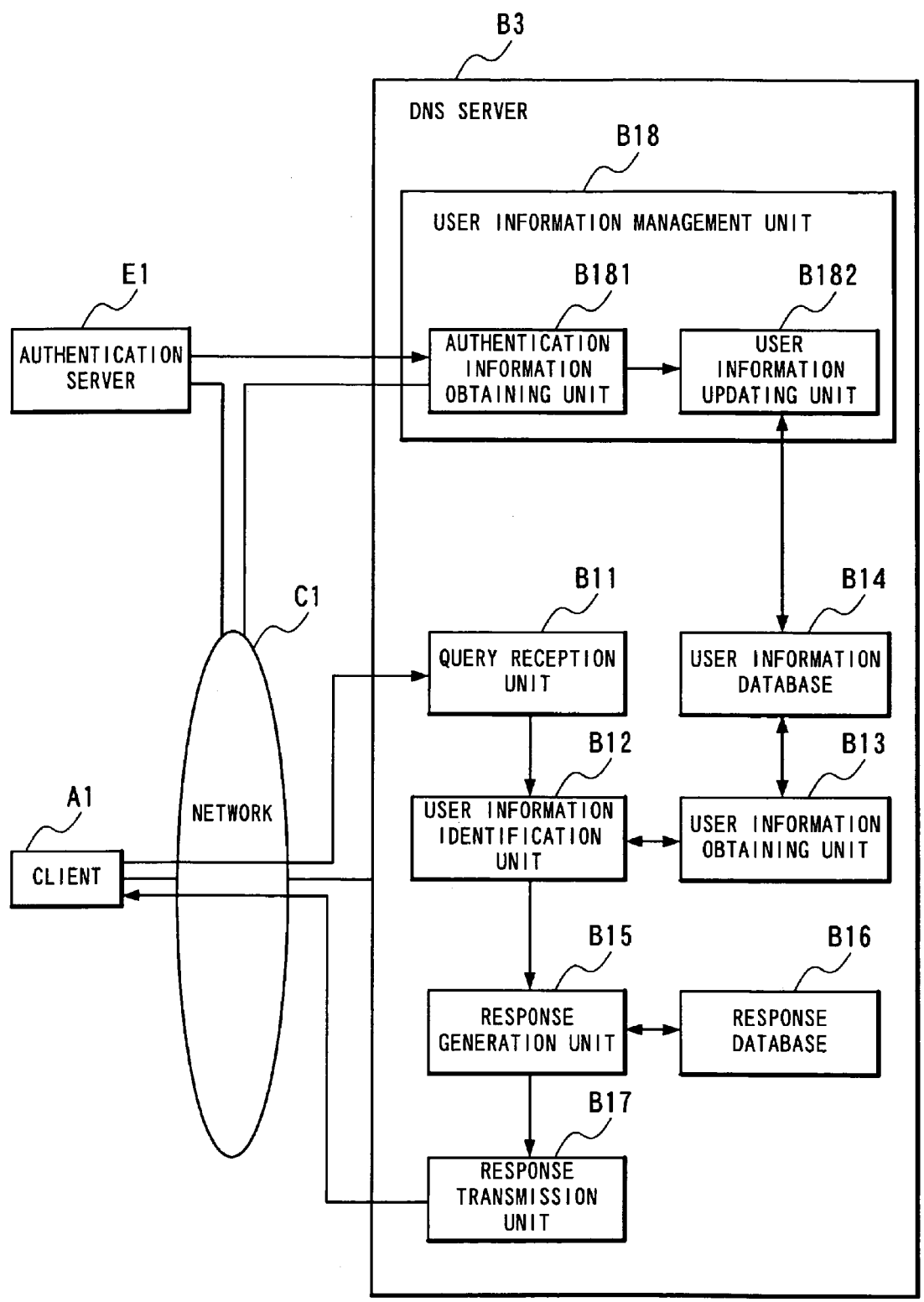
FIG. 9 is a block diagram showing a structure of a second embodiment of the present invention.

With reference to FIG. 9, the second embodiment of the present invention includes, in addition to the client A1 and the network C1 in the first embodiment shown in FIG. 1, a DNS server B3 and an authentication server E1 according to the present invention.

The second embodiment of the present invention differs from the first embodiment of the present invention in that management of the user information database B14 is automatically executed by a user information management unit B18 as a component of the DNS server B3 in cooperation with the authentication server E1. In the following, the system composed of the client A1, the DNS server B3 and the authentication server E1 will be referred to as the present system.

The authentication server E1 conducts user authentication in response to an authentication request from a user (client A1) in the system to allow or inhibit the user to log in to the system. The system here is not limited to the present system but represents all the systems which conduct user authentication at the time of use, including a network operated by an ISP and membership WEB service operated by an ASP (Application Service Provider). Users in the present system represent a part or all of the system users here.

The authentication server E1 conducts user authentication, as well as seizing user's log-in statuses whether a user (client A1) having sent an authentication request has logged in to the system or logged out of the same and further collecting user attribute information and holding these information as a log. Example of user attribute information collected by the authentication server E1 includes, similarly to the description of the first embodiment, location information of a user (client A1), information about favorites such as hobbies and an activity history, a kind of user terminal such as a cellular phone, a PDA or a notebook computer, information about a user terminal such as an OS installed in the user terminal, mounted network interface, CPU speed and memory, and information about conditions of connection to a network including an IP address of a user terminal, a kind of connection line such as ADSL or ISDN line, a connection line speed and an IP address of a connected NAS.

Among examples of the authentication server E1 is a RADIUS server widely used in user authentication and charging processing in an ISP or the like. In user authentication processing by the RADIUS protocol, the RADIUS server authenticates a user based on an ID and a password contained in an authentication request received from a user to allow or inhibit user's log-in. The RADIUS protocol is used in user authentication not only in a network operated by an ISP but also in many network systems.

To the RADIUS server, every time a user logs in or logs out of a network system, user's log-in statuses and user attribute information are transmitted from a RADIUS client such as a NAS. The RADIUS server collects these information for the purpose of charging and back-trace and holds the same as an Account Log. User attribute information sent by the RADIUS client to the RADIUS server includes a log-in ID of an ISP of a user, an IP address of a terminal used by a user, an IP address of an NAS to which a user connects and a kind of line connected.

The user information management unit B18 includes an authentication information obtaining unit B181 and a user information updating unit B182.

The authentication information obtaining unit B181 detects a change of user's log-in statuses and obtains information indicative of the user's log-in statuses and user attribute information from the authentication server E1 to hand over these information to the user information updating unit B182. There are the following two methods as an example of realizing detection of a change of user's log-in statuses and acquisition of information indicative of user's log-in statuses and user attribute information.

First is a method of having, when the authentication server E1 detects a change of user's log-in statuses, information indicative of the user's log-in statuses and user authentication information be notified from the authentication server E1 to the authentication information obtaining unit B181.

Second is a method in which by inquiring the authentication server E1 of user's log-in statuses, the authentication information obtaining unit B181 detects a change of the user's log-in statuses and when detecting a change of the log-in statuses, obtains information indicative of the user's log-in statuses and the user attribute information from the authentication server E1.

While in the first method, the authentication information obtaining unit B181 detects a change of user's log-in statuses by passive processing of waiting for a notice from the authentication server E1, the authentication information obtaining unit B181 conducts active processing of inquiring the authentication server E1 of user's log-in statuses in order to detect a change of the user's log-in statuses in the second method.

In the following, a specific example will be described for each of the methods.

First, a specific example of the first method is a method using a Proxy function and a Relay function of the RADIUS protocol. The Proxy function is a function of, every time a RADIUS server receives user's log-in statuses and user attribute information from a RADIUS client, transferring these information to other node. The Proxy function is a standardized function which is supported in substantially all the RADIUS servers currently used.

Figure 10:
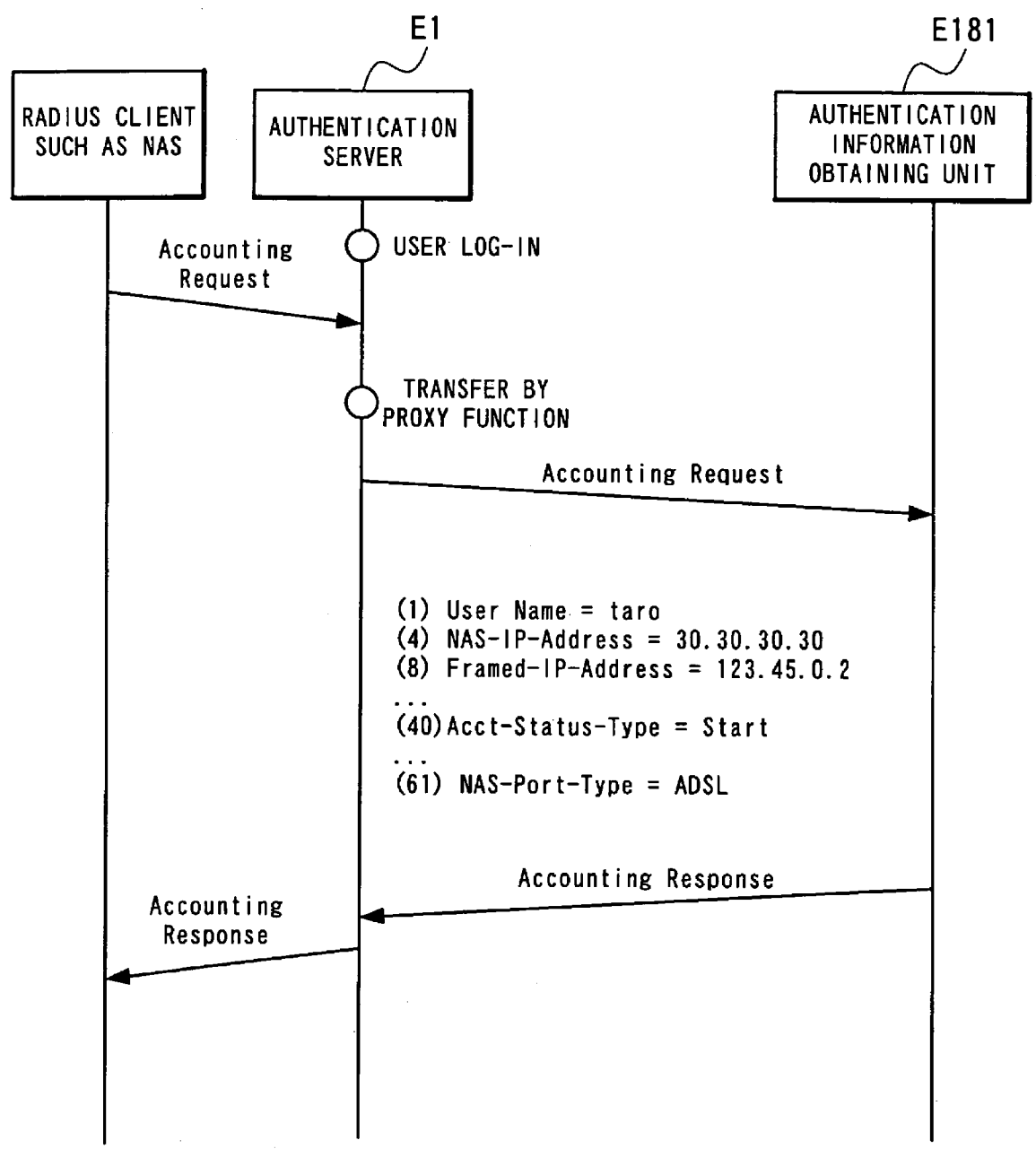
FIG. 10 is a sequence diagram showing an example of a message sequence at the time of obtaining user attribute information by an authentication information obtaining unit from an authentication server by using a Proxy function of a RADIUS protocol in a case where the authentication server is a RADIUS server in the second embodiment of the present invention.

Example of a sequence in a case of obtaining user's log-in statuses and attribute information by using the Proxy function is shown in FIG. 10. FIG. 10 illustrates a sequence example at the time when a user logs in to the system. In FIG. 10, the authentication server E1 is a RADIUS server. When user authentication succeeds and the user logs in to the system, the RADIUS client transmits an Accounting Request message to the authentication server E1.

The Accounting Request message includes user attribute information in a form of attribute=attribute value. In the illustrated example, the Accounting Request message contains information indicating that a user ID is taro ((1) User Name=taro), an IP address of a NAS is ⌈30.30.30.30⌉ ((4) NAS-IP-Address=30.30.30.30), an IP address of a user using terminal is 123.45.0.2 ((8) Framed-IP-Address=123.45.0.2) and a connection line is ADSL ((61) NAS-Port-Type=ADSL). Also included is information indicating that the user logs in to the system ((40) Acct-Status-Type=Start).

Upon receiving the Accounting Request message, the authentication server E1 transmits the received Accounting Request message to the user information management unit B18 by using the Proxy function. The user information management unit B18 obtains user attribute information from the received Accounting Request message. After receiving the Accounting Request message, the user information management unit B18 sends an Accounting Response message to the authentication server E1.

Next, acquisition of user information by using the Relay function will be described. The Relay function is a function of transmitting, every time a new log is added to the Account Log, the new log to other node by the RADIUS server. The Relay function is a de facto standard which is supported in many of RADIUS servers.

Figure 11:
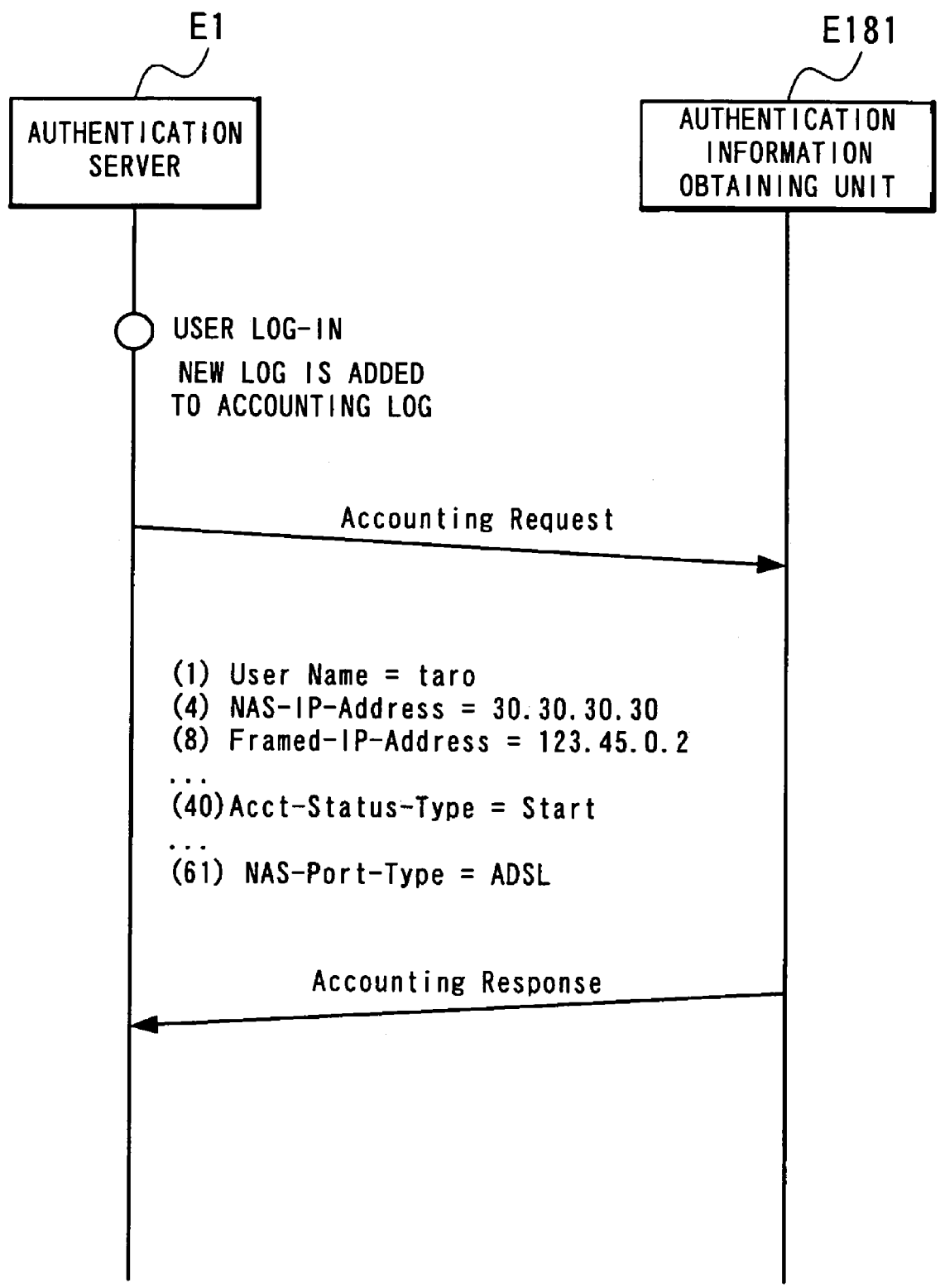
FIG. 11 is a sequence diagram showing an example of a message sequence at the time of obtaining user attribute information by the authentication information obtaining unit from the authentication server by using a Relay function of a RADIUS server in a case where the authentication server is a RADIUS server in the second embodiment of the present invention.

Example of a sequence is shown in FIG. 11 in a case of obtaining user's log-in statuses and attribute information by using the Relay function. Shown in FIG. 11 is a sequence executed when a user logs in to the system. In FIG. 11, the authentication server E1 is a RADIUS server. When user authentication succeeds and the user logs in to the system, a new log is added to the Account Log held by the authentication server E1. Based on the newly added log, the authentication server E1 generates an Accounting request message and transmits the same to the user information management unit B18.

In FIG. 11, the Accounting Request message contains information indicating that a user ID is taro ((1) User Name=taro), an IP address of a NAS is ⌈30.30.30.30⌉ ((4) NAS-IP-Address=30.30.30.30), an IP address of a user using terminal is 123.45.0.2 ((8) Framed-IP-Address=123.45.0.2) and a connection line is ADSL ((61) NAS-Port-Type-ADSL). Also included is information indicating that the user logs in to the system ((40) Acct-Status-Type=Start). The user information management unit B18 obtains user attribute information from the received Accounting Request message. After receiving the Accounting Request message, the user information management unit B18 transmits an Accounting Response message to the authentication server E1.

Next, description will be made of a specific example of the second method. The authentication information obtaining unit B181 periodically transmits a message inquiring about user's log-in statuses to the authentication server E1 to check whether there occurs a change in the user's log-in statuses. When a change is detected in the user's log-in statuses, the unit requests transmission of information indicative of the user's log-in statuses and the user attribute information from the authentication server E1.

More specific examples of the second method include a method employing an NFS (Network File System) function and a method which employs an SNMP (Simple Network Management Protocol). NFS is file service provided through a network which is commonly used under TCP/IP environments and has a function of, with a file held by other node connected through the network mounted on its own node, handling the file as if it is a local file. In the method employing the NFS function, the user information management unit B18 mounts a log file including user's log-in statuses and user attribute information held by the authentication server E1. The authentication information obtaining unit B181 detects a change of the user's log-in statuses by periodically checking the log file mounted on its own node. When detecting a change of the user's log-in statuses, obtain the user attribute information whose log-in statuses are changed from the mounted log file.

On the other hand, the SNMP is a protocol for conducting management and monitoring of other node under the TCP/IP network environments. Exchanging management information called MIB (Management Information Base) by two, one of which is an "SNMP manager" on the management side and the other of which is an "SNMP agent" on the side managed, realizes management of other node. In the method using the SNMP, with the authentication information obtaining unit B181 as an SNMP manager and the authentication server E1 as an SNMP agent, out of the MIB of the authentication server E1, a part indicative of a user's log-in status is periodically checked. When detecting a change of the user's log-in status, obtain a part relevant to the user attribute information whose log-in status is changed from the MIB of the authentication server E1.

Based on the information handed over from the authentication information obtaining unit B181, the user information updating unit B182 manages the user information database B14. The management includes, for example, adding user attribute information of a user who is logged in to the present system to the user information database B14 and conversely deleting the user attribute information of the user who is logged out from the user information database B14.

Figure 12:
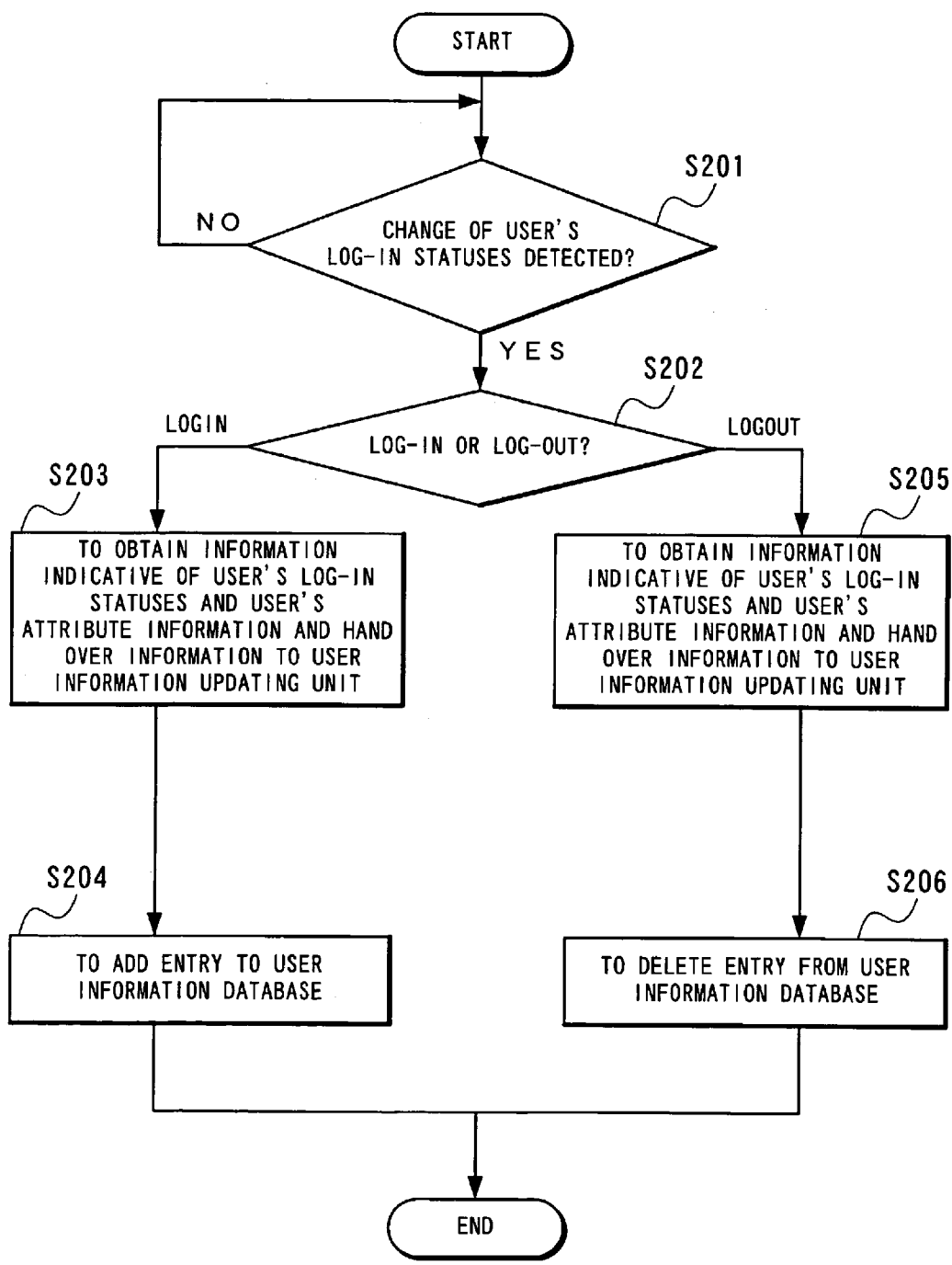
FIG. 12 is a flow chart showing operation of a user information management unit according to the second embodiment of the present invention.

Next, operation of the second embodiment will be described in detail with reference to the drawings. Since operation of the DNS server B1 from the reception of a DNS query message from the client A1 to the transmission of a DNS response message is the same as that in the first embodiment shown in FIG. 4, its description will be omitted. In the following, detailed description will be made of management of the user information database B14 by the user information management unit B18 with reference to FIG. 12.

Upon detecting a change of user's log-in statuses (Step S201 in FIG. 12), the authentication information obtaining unit B181 determines whether the change of the log-in statuses in question corresponds to log-in or log-out (Step S202).

When the user has logged in to the system, obtain information indicative of the user's log-in statuses and the user attribute information from the authentication server E1 to hand over these information to the user information updating unit B182 (Step S203). The user information updating unit B182 examines the information indicative of the user's log-in statuses to additionally register the user attribute information in the user information database B14 (Step S204).

When the user has logged out of the system at Step S202, the authentication information obtaining unit B181 obtains the information indicative of the user's log-in statuses and the user attribute information from the authentication server E1 and hands over these information to the user information updating unit B182 (Step S205) and the user information updating unit B182 searches the user information database B14 for an entry relevant to the user based on the user attribute information to delete the entry (Step S206).

In the foregoing description of the second embodiment, the DNS server B1 includes the user information database B14 as its component. In another possible structure, the user information database B14 may be held not in the DNS server B1 but in another server similarly to the first embodiment. The structure in this case is shown in FIG. 13 as another example of the second embodiment.

Figure 13:
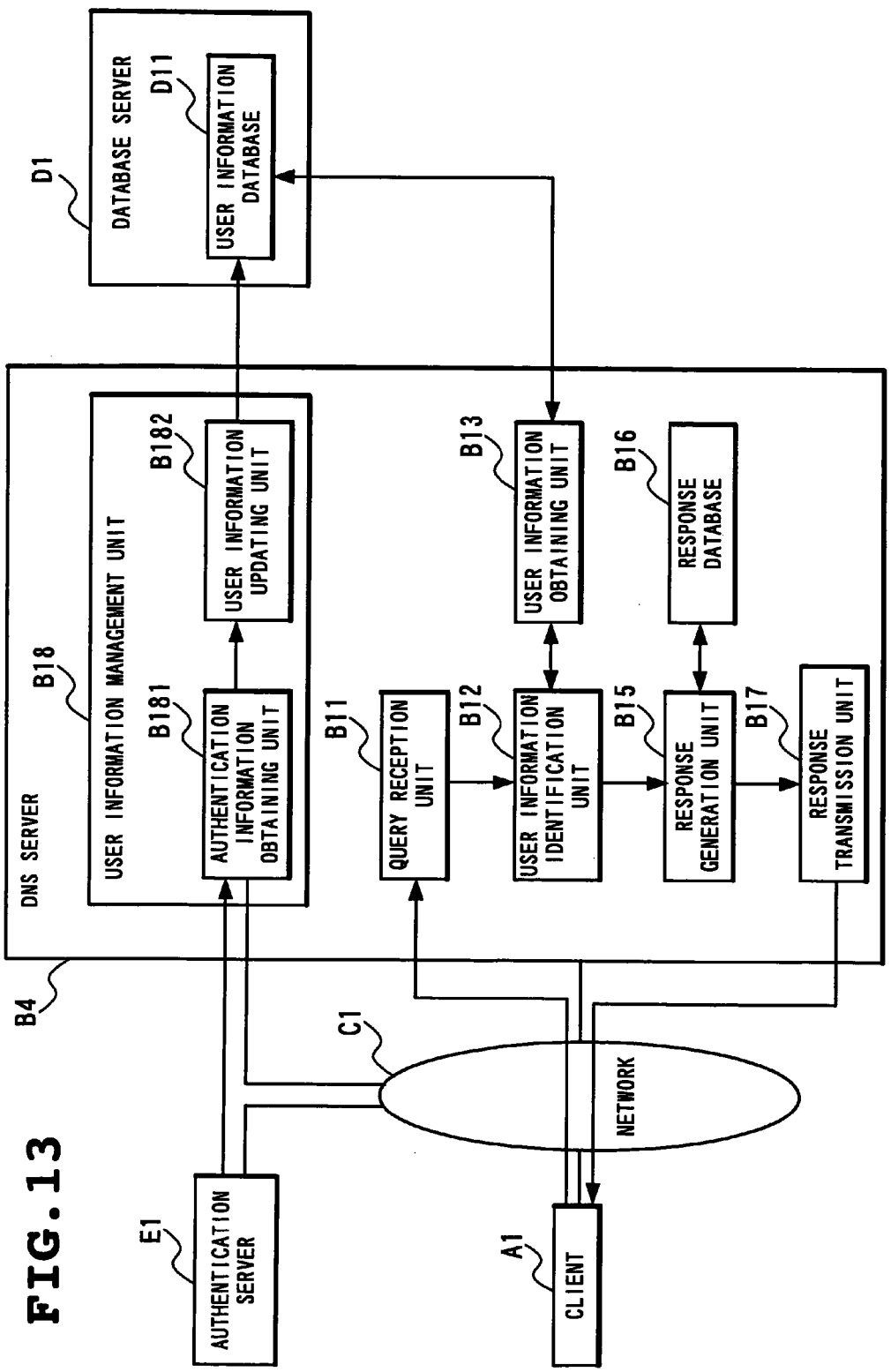
FIG. 13 is a block diagram showing a structure in which a user information database is held by a database server according to the second embodiment of the present invention.

In the structure shown in FIG. 13, as compared with the above-described structure illustrated in FIG. 9, a DNS server B4 not including the user information database B14 is used in place of the above-described DNS server B3 and the database server D1 including the user information database D11 as its component is further used.

In the arrangement shown in FIG. 13, a conventional DNS server or the DNS servers B1, B2, B3 and B4 (including a DNS server B5 which will be described later in the following third embodiment) of the present invention may be used as the database server D1. In this case, the response database B16 in the DNS server will be used as the user information database D11.

In this case, possible method of updating user attribute information of the user information database D11 by the user information updating unit B182 is a method using a DNS Dynamic Update. The DNS Dynamic Update is a system for executing entry addition and deletion to and from a database held in a DNS server by other node. A node which conducts the DNS Dynamic Update encodes information to be added or deleted into a form of a resource record defined by the DNS and transmits a message with the information embedded to the DNS server. Upon receiving the message, the DNS server adds or deletes the entry to or from its held response database.

In the method using the DNS Dynamic Update, the user information updating unit B182 encodes the user attribute information handed over from the authentication information obtaining unit B181 into a DNS resource record and transmits a message with the information embedded to the DNS server. Upon receiving the message, the DNS server adds or deletes an entry relevant to the resource record embedded in the message to or from the response database (corresponding to the user information database D11). The zone file 302 shown in FIG. 8 is an example of an entry in the generated response database.

Operation of the DNS server B4 in the structure shown in FIG. 13 can be considered the same as the operation of the above-described DNS server B3 by replacing the user information database B14 with the user information database D11.

Next, effects of the second embodiment will be described.

In obtaining and managing user attribute information necessary for customizing name resolution by a DNS server, manual management of the attribute information in question requires enormous labor and costs.

Since in an ISP (Internet Service Provider) network, for example, there exist numbers of users and attribute information (location, IP address, kind of connection line, etc.) of an individual user dynamically changes, manual management of the same will be extremely difficult.

In the present embodiment, the user information management unit B18 cooperates with the authentication server E1 to manage the user information database B14. Registration and deletion of the user attribute information at and from the user information database B14 is automatically conducted by the user information management unit B18. As a result, labor and cots required for setting management (registration and deletion of user attribute information) of the user information database B14 can be reduced more than that in the first embodiment.

In addition, while the authentication information obtaining unit B181 obtains user information from the authentication server E1 in the present embodiment, the authentication server requires no special function for obtaining user information. Although as methods of obtaining user information, the method using the Proxy function or the Relay function of the RADIUS server and the method using an NFS and the method using an SNMP are taken as examples in the foregoing, these are functions standardized or made a de facto standard and can be used only by changing setting in many of authentication servers currently used. Therefore, in introducing the present system into an existing system, no introduction costs are required for disposing a new authentication server and replacing an existing authentication server with a dedicated authentication server. Also after the introduction of the present system, since authentication processing and log collection are conducted at the same authentication server, no costs for changing a mode of operation of authentication processing and charging processing in the existing system will be incurred.

Next, a third embodiment of the present invention will be described in detail with reference to the drawings.

Figure 14:
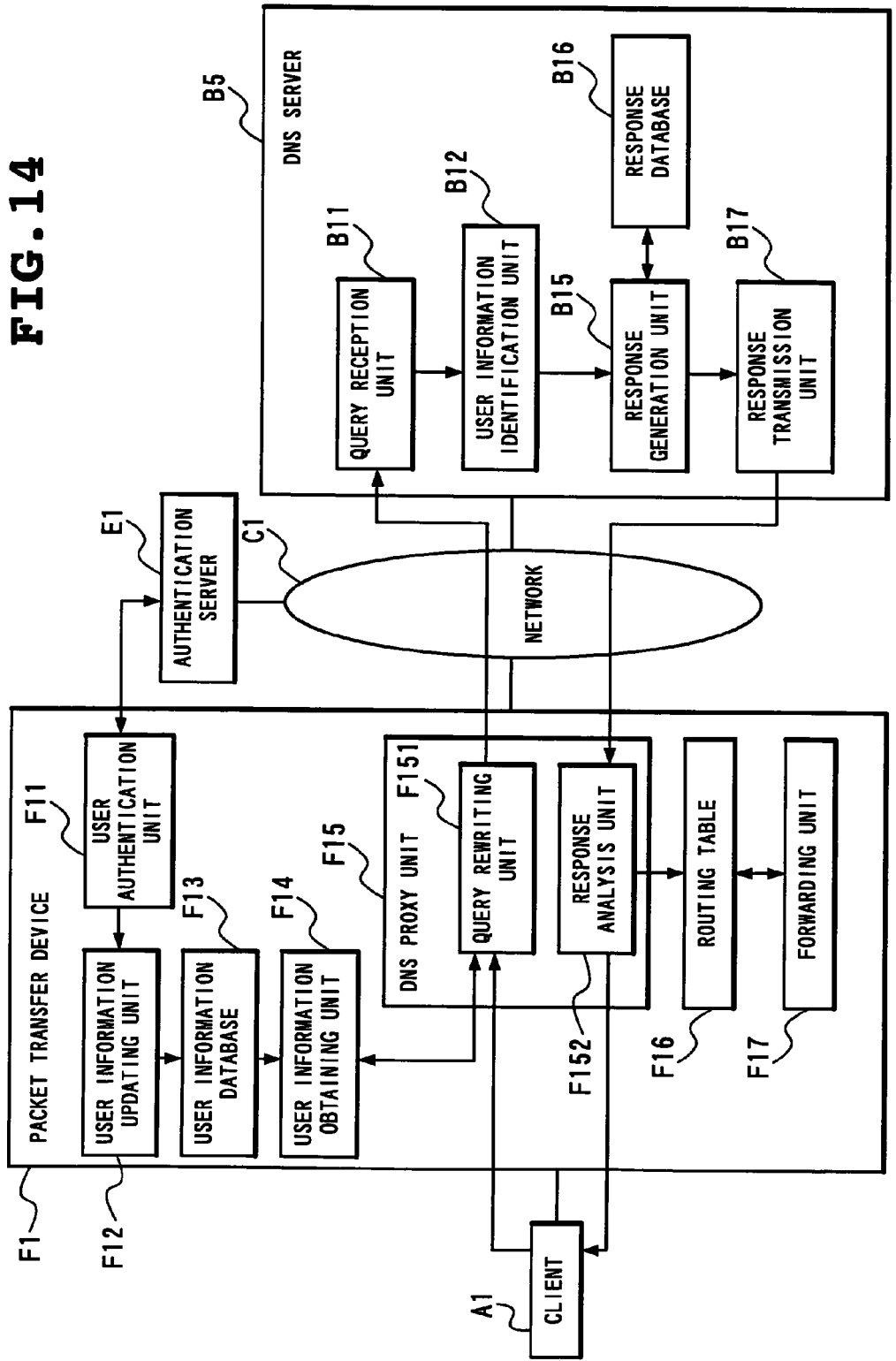
FIG. 14 is a block diagram showing a structure of a third embodiment of the present invention.

With reference to FIG. 14, the third embodiment of the present invention is realized to include a DNS server B5 and a packet transfer device F1 in addition to the client A1 and the authentication server E1 described in the second embodiment shown in FIG. 9. The DNS server B5 and the authentication server E1 and the packet transfer device F1 are connected to each other through the network C1. A packet sent and received to/from the network C1 side by the client A1 passes through the packet transfer device E1 without fail. The packet transfer device here represents every device having a packet transfer processing function such as an Ethernet® switch, an ATM switch, a router, a layer 4 switch or a layer 7 switch.

The DNS server B5 differs in structure from the DNS server B1 in the first embodiment shown in FIG. 1 in failing to require the user information obtaining unit B13 and the user information database B14 as its component. In the following, the structure including the DNS server B5 will be described, in which the DNS server B5 may be replaced by any of the DNS servers B1, B2, B3 and B4 shown in the first and second embodiments.

Contents registered in the response database B16 are shown as an example in FIG. 15. The response database B16 includes a name resolution table 401, and zone files 402 and 403. The name resolution table 401 and the zone file 402 (or 403) correspond to the name resolution table 201 and the zone file 202 (or 203) in FIG. 3 which have been described in the first embodiment of the present invention.

In the third embodiment, it is here assumed that user attribute information is handled including attribute information regarding a packet transfer device in addition to the example of the user attribute information described in the first and second embodiments. More specifically, the name resolution table 401 differs from the name resolution table 201 in including, as user attribute information, not only attribute information such as a user ID and a kind of connection line but also attribute information regarding the packet transfer device F1 and in allowing registration of a reference destination of a name resolution method for each attribute information regarding the packet transfer device F1. Among examples of attribute information regarding the packet transfer device F1 here are information about an identifier (ID) of the packet transfer device F1 and a transfer method supported by the packet transfer device F1 (e.g. method supporting vlan of an Ethernet® or supporting a URL-based switching).

In the name resolution table 401 shown in FIG. 15, user information includes, as user attributes, not only attribute information such as a user ID, a kind of connection line and a group ID but also a packet transfer device ID and allows registration of a reference destination of a name resolution for each packet transfer device ID. In addition, the zone file 402 (or 403) is different in having a field (Additional Data) for storing additional information in each entry in addition to the field (Type, FQDN, Data) shown in the zone file 202 (or 203).

In the present embodiment, such a field for storing additional information is used for storing a packet transfer method at the packet transfer device F1. Methods of transferring a packet include priority for transferring the packet in question (packet transfer priority), an ID (logical network ID) of a logical network (VPN (Virtual Private Network), vlan, etc.) in which the packet is to be transferred, a logical channel (VCI (Virtual Channel Identifier) of ATM) by which the packet in question is transferred and an ID of LSP (Label Switched Path) etc.) of MPLS (Multiprotocol Label Switching) and a method of rewriting of, addition to and deletion from a header of the packet.

The first entry in the zone file 402 indicates that a response of an A record for www.ddd.com is [20.1.1.1] and for a packet whose destination IP address is [20.1.1.1] to which transmission is made by the client A1 as a result of reference to the entry in question, used at the packet transfer device F1 is a transfer method of rewriting a source IP address (SrcIPAddr) to [40.1.1.1] and rewriting vlan-ID (vlanID) in an MAC header to [111] to transfer an obtained packet at an ordinary transfer priority through an output port 21.

In a case where when generating a DNS response message to a DNS query message, if the Additional Data field is registered in the entry in the response database B16 to be referred to, the response generation unit B15 stores the contents indicated in the Additional Data into the generated DNS response message. This storage method includes storing the contents indicated in the Additional Data into an additional information part of the DNS message as described above.

Storing the contents indicated in the Additional Data into the additional information part of the DNS response message enables the response message in question to simultaneously include not only an IP address for an FQDN inquired by the client A1 (or other resource record data) but also a method of transferring a packet transmitted from the client A1 to the IP address in question conducted at the packet transfer device F1.

The packet transfer device F1 includes a user authentication unit F11, a user information updating unit F12, a user information database F13, a user information obtaining unit F14, a DNS proxy unit F15, a routing table F16 and a forwarding unit F17.

The user authentication unit F11 has a function of identifying and authenticating a user on the client A1 connected to the packet transfer device F1. The unit furthermore stores various user attribute information of a user obtained at the time of authentication into the user information database F13 through the user information updating unit F12. Representative of user authentication at the packet transfer device F1 is IEEE 802.1x as a user authentication mechanism standardized in an Ethernet® switch.

When the packet transfer device F1 supports IEEE 802.1x, the user authentication unit F11 conducts authentication by communicating with the authentication server C1 by using the RADIUS protocol based on a user ID and a password of a user on the client A1, thereby determining whether communication of the client A1 with the network C1 side is allowed or not.

Based on the information handed over from the user authentication unit F11, the user information updating unit F12 manages the user information database F13. Conducted, for example, is adding user attribute information of a user who will log in to the packet transfer device F1 to communicate to the user information database F13 and conversely deleting the user attribute information of a user who has logged out from the user information database F13.

The user information database F13 is a database for storing user attribute information of a user authenticated by the user authentication unit F11. Examples of user attribute information stored in the user information database F13 are the same as those of the user attribute information described in the first embodiment. Example of the user information database is shown as a user information database 501 illustrated in FIG. 16. In the user information database 501, with respect to an input port and a source MAC address corresponding to a packet received by the packet transfer device F1, a user ID, a kind of connection line, a connection line speed and a group ID of the packet in question are described.

Indicated in the first entry, for example, is that for a packet whose input port is [02] and source MAC address is [00:12:34:56:78:9a], a user ID of a sender of the packet is [taro], a kind of a connected line is Ethernet®, its speed is 100 Mbps and an ID of a group in which the packet sender in question is included is [silver].

The user information obtaining unit F14 has a function of obtaining user attribute information corresponding to a sender of a DNS query message received at a query rewriting unit F151 in the DNS proxy unit F15 from the user information database F13 and handing over the user attribute information in question to the query rewriting unit F151.

The DNS proxy unit F15 has a function of reading and analyzing contents of a DNS query message and a DNS response message flowing between the client A1 and the DNS server B5 to rewrite the message contents and transmit the rewritten message. The DNS proxy unit F15 includes the query rewriting unit F151 and a response analysis unit F152 as its component.

The query rewriting unit F151 has a function of adding, to a DNS query message transmitted toward the DNS server B5 by the client A1, user attribute information about a user who has transmitted the DNS query message in question and transmitting the obtained message to the DNS server B5. On this occasion, attribute information regarding the packet transfer device F1 can be included in the user attribute information as required. Here, the user attribute information regarding the user who has transmitted the DNS query message is obtained from the user information database F13 through the user information obtaining unit F14 to have attribute information regarding the packet transfer device F1 added as required.

The response analysis unit F152 has a function of extracting, from a DNS response message transmitted by the DNS server B5 toward the client A1, a packet transfer method embedded in the message in question. The unit further registers an entry corresponding to the extracted packet transfer method at the routing table F16.

The routing table F16 is a database in which a method of transferring a packet received by the forwarding unit F17 is stored. Among tables represented by the routing table F16 are a table in which a received packet transfer method at a router is stored and a table in which a switching method at an Ethernet® switch is stored. Entries in the routing table F16 can be generated, other than by statically setting as in conventional art or based on information dynamically obtained by a routing protocol, by the response analysis unit F152.

Example of the contents of the routing table F16 is shown in FIG. 17. The second entry in the routing table F16 shows that with an input port, a source MAC address, a destination IP address and a vlan-ID of a packet received by the packet transfer device F1 are [11], [00:bc:de:f0:12:34], [60.1.1.1] and [200], respectively, the source IP address, the destination IP address and the vlan-ID of the packet in question are rewritten to [401.1.1], [90.1.1.1] and [333] to output the obtained packet through the output port [31]. In addition, the priority indicates [high priority] to denote that transmission will be made at high packet transfer priority.

The forwarding unit F17 has a function of solving a method of transferring a packet received by the packet transfer device F1 and transferring the packet in question based on the transfer method. The method of transferring the received packet here is solved by referring to the routing table F16.

Next, detailed description will be made of operation of the packet transfer device F1 and the DNS server B5 which is executed from transmission of a DNS query message to the DNS server B5 by the client A1 until return of a corresponding DNS response message to the client A1 in the present embodiment with reference to the drawings.

Figure 18:
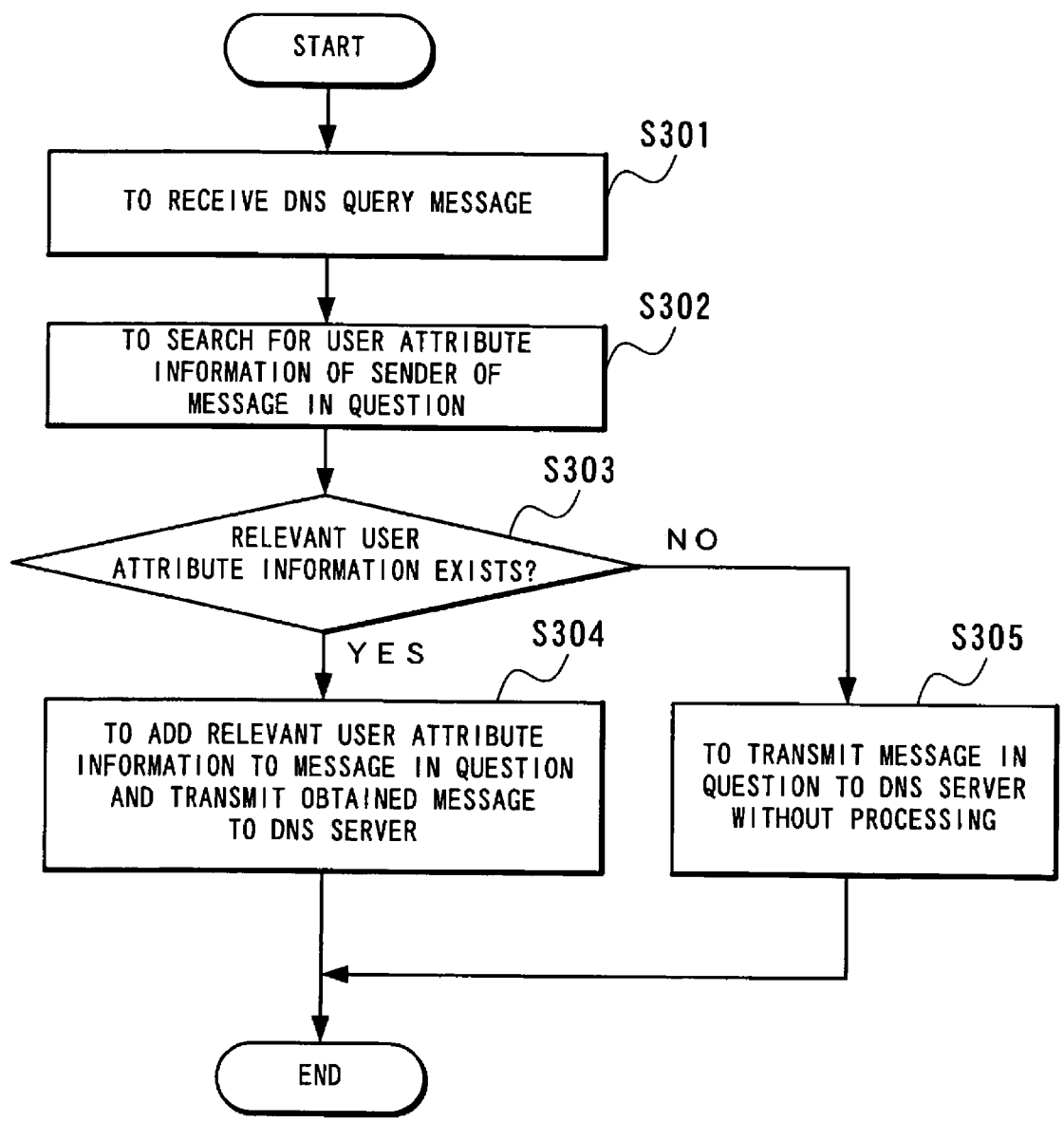
FIG. 18 is a flow chart showing operation of a packet transfer device executed at the time of receiving a DNS query message from a client in the third embodiment of the present invention.

First, description will be made of operation at the packet transfer device F1 at the time when the client A1 transmits a DNS query message to the DNS server B5 with reference to the flow chart shown in FIG. 18.

When the client A1 transmits a DNS query message to the network C1 side, the packet transfer device F1 detects the message in question and receives the same. The DNS query message received by the packet transfer device F1 is handed over to the query rewriting unit F151 in the DNS proxy unit F15 (Step S301 in FIG. 18).

Here, since in the message in question, an IP address of the DNS server B5 is designated as a destination IP address, a method is required of handing over only the message in question to the query rewriting unit F151 without transfer similarly to an ordinary packet. This method includes a method of handing over only a packet having a specific port number indicative of the DNS query message to the query rewriting unit F151 (the DNS query message can be identified based on being a packet whose destination port number is 53 in general).

Next, search for user attribute information of a sender of the DNS query message received at the query rewriting unit F151 with reference to the user information database F13 (Step S302).

Assuming, for example, that the user information database F13 stores the same entries as those of the user information database 501 shown in FIG. 16, with respect to a DNS query message which is received from the port 11 and whose source MAC address is [00:bc:de:f0:12:34], reference to the user information database F13 results in searching user attribute information including a sender's user ID of [hanako], a kind of connection line being an Ethernet®, a connection line speed of 10 Mbps, etc. [-] indicated in the item of the group ID denotes that the group ID is unknown or that it is an attribute whose acquisition is unnecessary.

When the search of the user attribute information at Step S302 results in finding that there exists user attribute information corresponding to the sender of the received DNS query message, add the corresponding user attribute information to the DNS query message in question by the query rewriting unit F151 and transmit the obtained message to the DNS server B5 (Steps S303 and S304).

When at Step S304, there is a need of adding, other than the user attribute information solved with reference to the user information database F13, attribute information regarding the packet transfer device F1 to the DNS query message in question as user attribute information, add the attribute information regarding the packet transfer device F1 to the message in question and transmit the obtained message to the DNS server B5. Other than the user attribute information solved with reference to the user information database F13, add, for example, an ID of the packet transfer device F1 to the message in question.

When the search of the user attribute information at Step S302 results in finding that there exists no user attribute information corresponding to the sender of the received DNS query message, the query rewriting unit F131 transmits the message in question to the DNS server B5 without adding any information (Steps S303 and S305).

Figure 19:
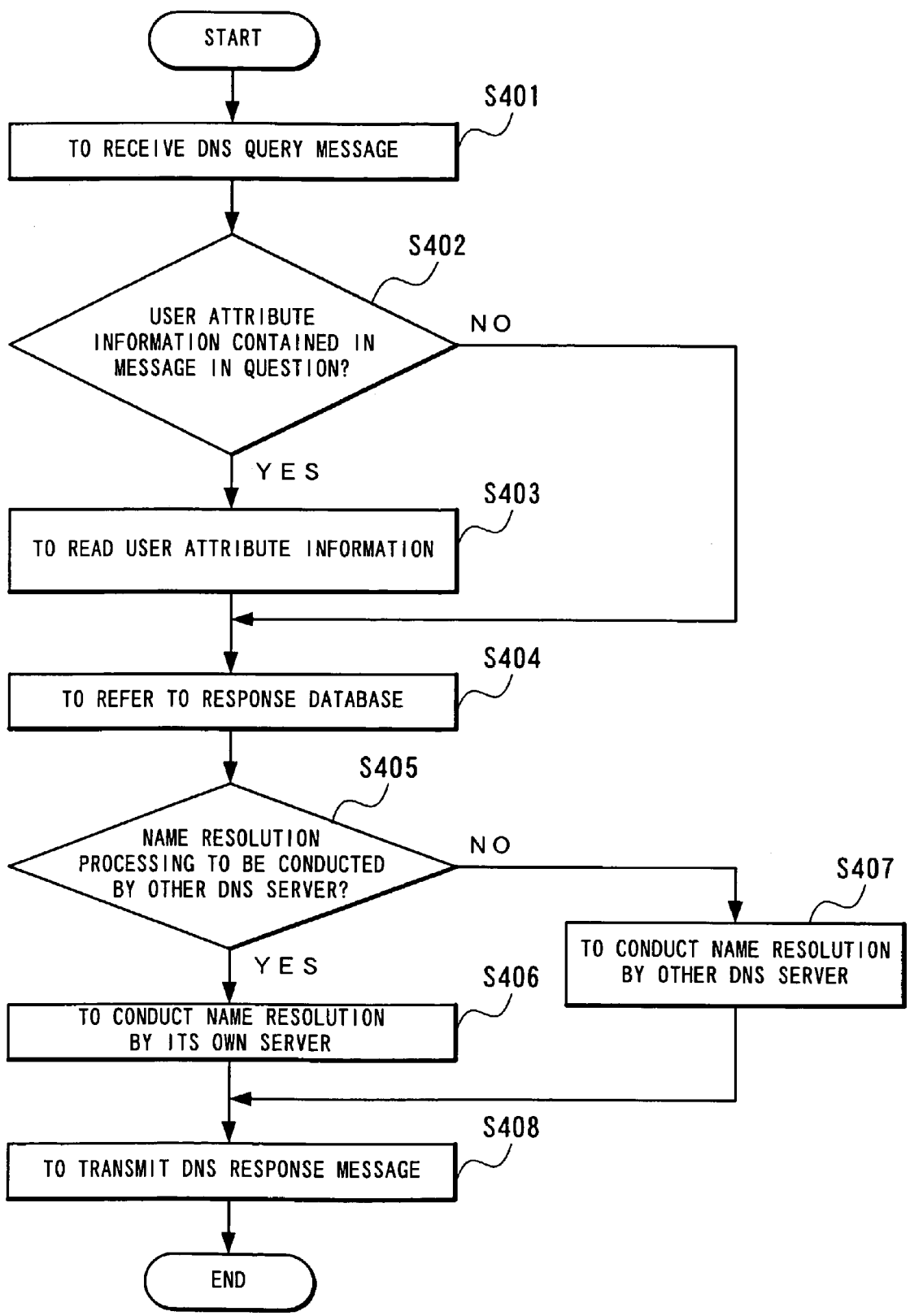
FIG. 19 is a flow chart showing operation of a DNS server according to the third embodiment of the present invention.

Next, operation of the DNS server B5 at the time when the DNS server B5 receives a DNS query message through the packet transfer device F1 will be described with reference to FIG. 19.

First, upon receiving a DNS query message (Step S401 in FIG. 19), the query reception unit B11 hands over the message in question to the user information identification unit B12.

The user information identification unit B12 identifies sender's user attribute information being embedded in the received DNS query message (Step S402).

When the determination is made that the sender's user attribute information is embedded in the message in question as a result of the processing at Step S402, read and identify the sender's user attribute information embedded in the hand over the message to the response generation unit B15 together with the identified user attribute information (Step S403).

When the determination is made that the sender's user attribute information is not embedded into the message in question as a result of the processing at Step S402, hand over the message to the response generation unit B15 assuming that the sender's user attribute information corresponding to the message in question fails to exist.

After Steps S402 and S403, operation at Steps S404 to S408 is the same as that of Steps S103 to S107 in FIG. 4 which has been described with respect to the first embodiment.

At Step S408, when the packet transfer method at the packet transfer device F1 is at the same time added to the DNS response message generated by the response generation unit B15, the response transmission unit B17 transmits a DNS response message including the packet transfer method at the packet transfer device F1 to the client A1.

Figure 20:
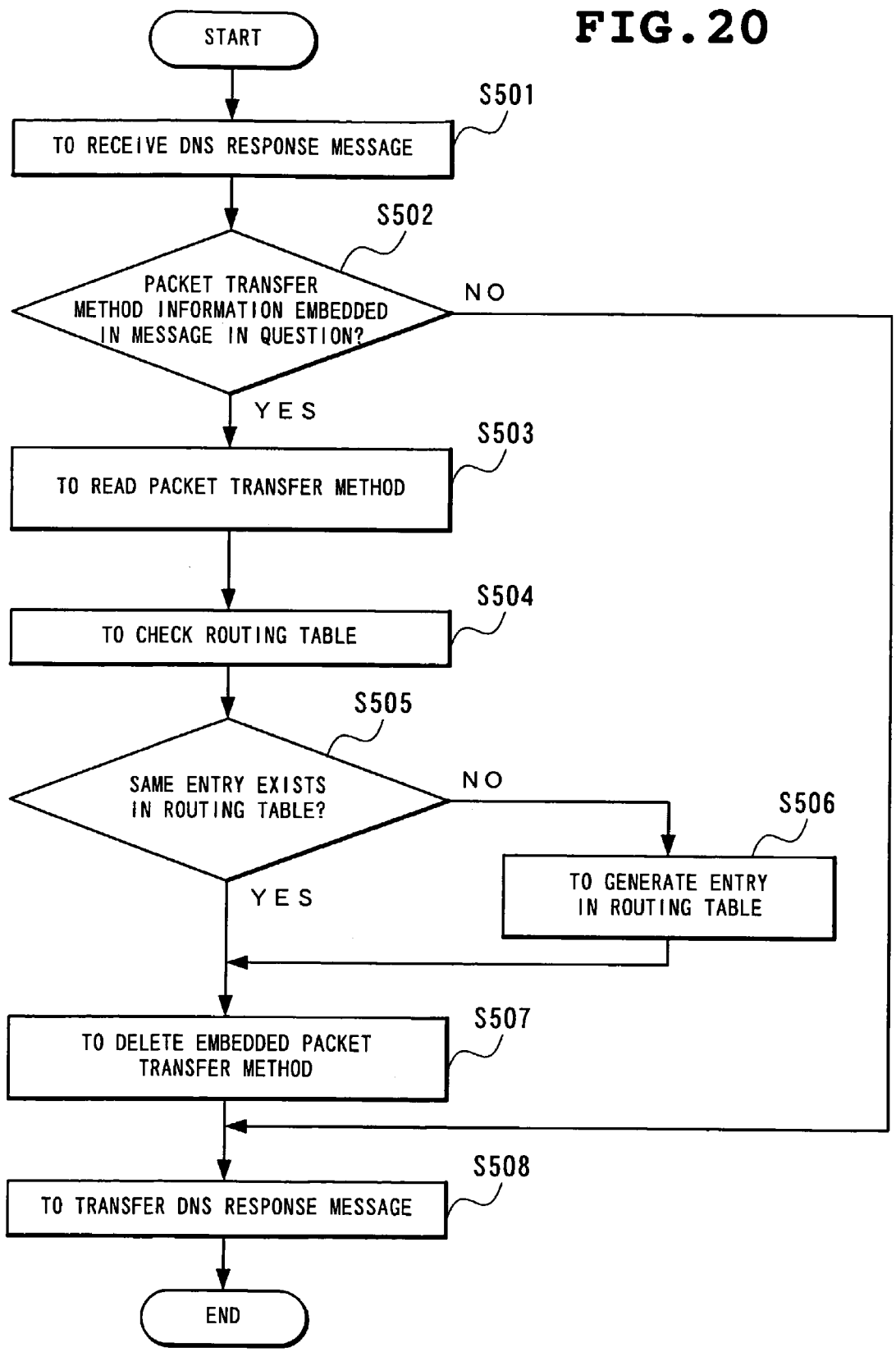
FIG. 20 is a flow chart showing operation of a packet transfer device executed at the time of receiving a DNS response message from the DNS server in the third embodiment of the present invention.

Next, operation executed by the packet transfer device F1 when receiving a DNS response message from the DNS server B5 will be described with reference to the flow chart in FIG. 20.

When the DNS server B5 transmits a DNS response message to the client A1, the packet transfer device F1 detects the message and receives the same. The DNS response message received by the packet transfer device F1 is handed over to the response analysis unit F152 in the DNS proxy unit F15 (Step S501 in FIG. 20).

Here, since in the message in question, an address of the client A1 is designated as a destination IP address, there arises the need of handing over only the message in question to the response analysis unit F152 without transfer similarly to an ordinary packet. This method can be considered the same as the method described with respect to the operation of Step S301 in FIG. 18 (the DNS response message can be identified based on being a packet whose source port number is 53).

Next, the response analysis unit F152 checks the contents of the received DNS response message to examine whether the packet transfer method at the packet transfer device F1 is embedded into the message in question (Step S502).

When the processing at Step S502 results in finding that the packet transfer method is embedded, the response analysis unit F152 reads out the embedded packet transfer method (Step S503). In the following, description will be made of a case where the DNS server B5 generates a DNS response message by using the first entry in the zone file 402 shown in FIG. 15 and the message in question is transmitted from the DNS server B5 to the client A1.

Next, the response analysis unit F132 refers to the entries registered at the routing table F16 to check whether there exists the same entry as an entry generated by the packet transfer method embedded into the received DNS response message (Steps S504 and S505).

When no entry is found which indicates the same transfer method as a result of the processing at Step S505, the response analysis unit F152 generates an entry corresponding to the packet transfer method embedded into the received DNS response message for the routing table F16 (Step S506).

Here, an example of generation of an entry indicating the packet transfer method for the routing table F16 will be described. Assume that the DNS server B5 generates a DNS response message by using the first entry of the zone file 402 in the response database B16 shown in FIG. 15 and the message in question transmitted toward the client A1 is received by the packet transfer device F1. Further assuming that a MAC address of the client A1 as a transmission destination of the message in question is [00:12:34:56:78:9a] and transfer between the client A1 and the packet transfer device F1 is made through the port [02] of the packet transfer device F1 by using an Ethernet® vlan whose vlan-ID is [100], the first entry in the routing table F16 shown in FIG. 17 will be generated.

When an entry is found which indicates the same transfer method as a result of the processing at Step S505, skip the operation at Step S506 for avoiding generation of an overlapping entry.

Next, the response analysis unit F152 deletes the packet transfer method embedded in the received DNS response message from the message in question (Step S507) and transfers the message in question to the client A1 (Step S508).

When finding that the packet transfer method is not embedded as a result of the processing at Step S502, the response analysis unit F152 transfers the received DNS response message to the client A1 without processing (Step S508).

In the present embodiment described in the foregoing with reference to FIG. 14, the user information database F13 in the packet transfer device F1 is formed by storing, by the user authentication unit F11, the user attribute information obtained at the time of authentication between the user authentication unit F11 and the authentication server E1 through the user information updating unit F12. Another possible manner is manually writing user attribute information into the user information database F13 from outside by a manager of the packet transfer device F1 or the like. In this case, the user authentication unit F11, the user information updating unit F12 and the authentication server E1 are unnecessary as the components of the present embodiment.

In the third embodiment described with reference to FIG. 14, the packet transfer device F1 includes the user information database F13 as its component. In another possible structure, the user information database F13 is held not in the packet transfer device F1 but in other server (external database etc.). The structure obtained in this case is shown in FIG. 21 as another example of the third embodiment.

Figure 21:
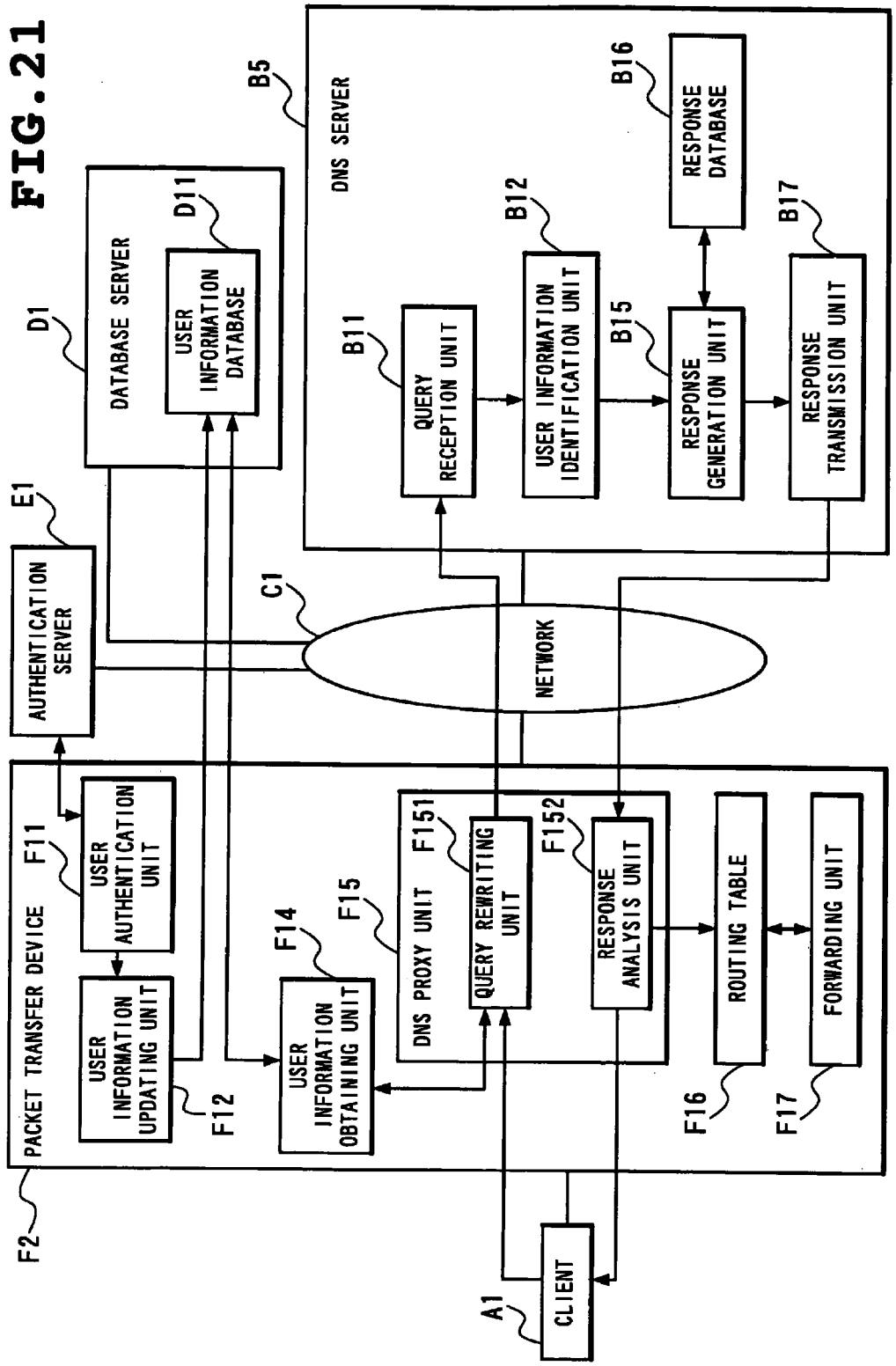
FIG. 21 is a block diagram showing a structure in which the user information database is held by a database server according to the third embodiment of the present invention.

In the structure shown in FIG. 21, as compared with the structure in FIG. 14 described above, a packet transfer device F2 not including the user information database F13 is used in place of the previously described packet transfer device F1 and the database server D1 shown in FIG. 7 which has been described with respect to the first embodiment is further used. The function of the database server D1, similarly to that described in the first embodiment, can be also realized as one function of the DNS server B1, B2 or B5. In this case, the user information obtaining unit F14 conducts acquisition of user attribute information by using a DNS message.

Operation of the packet transfer device F2 in the structure shown in FIG. 21 can be considered the same as the operation of the above-described packet transfer device F1 by replacing the user information database F13 with the user information database D11.

Moreover, in the present embodiment described with reference to FIG. 14, although the description has been made with respect to the structure in which the DNS proxy unit F15 of the packet transfer device has both the query rewriting unit F151 and the response analysis unit F152, the DNS proxy unit F15 may include either one of the query rewriting unit F151 and the response analysis unit F152.

Figure 22:
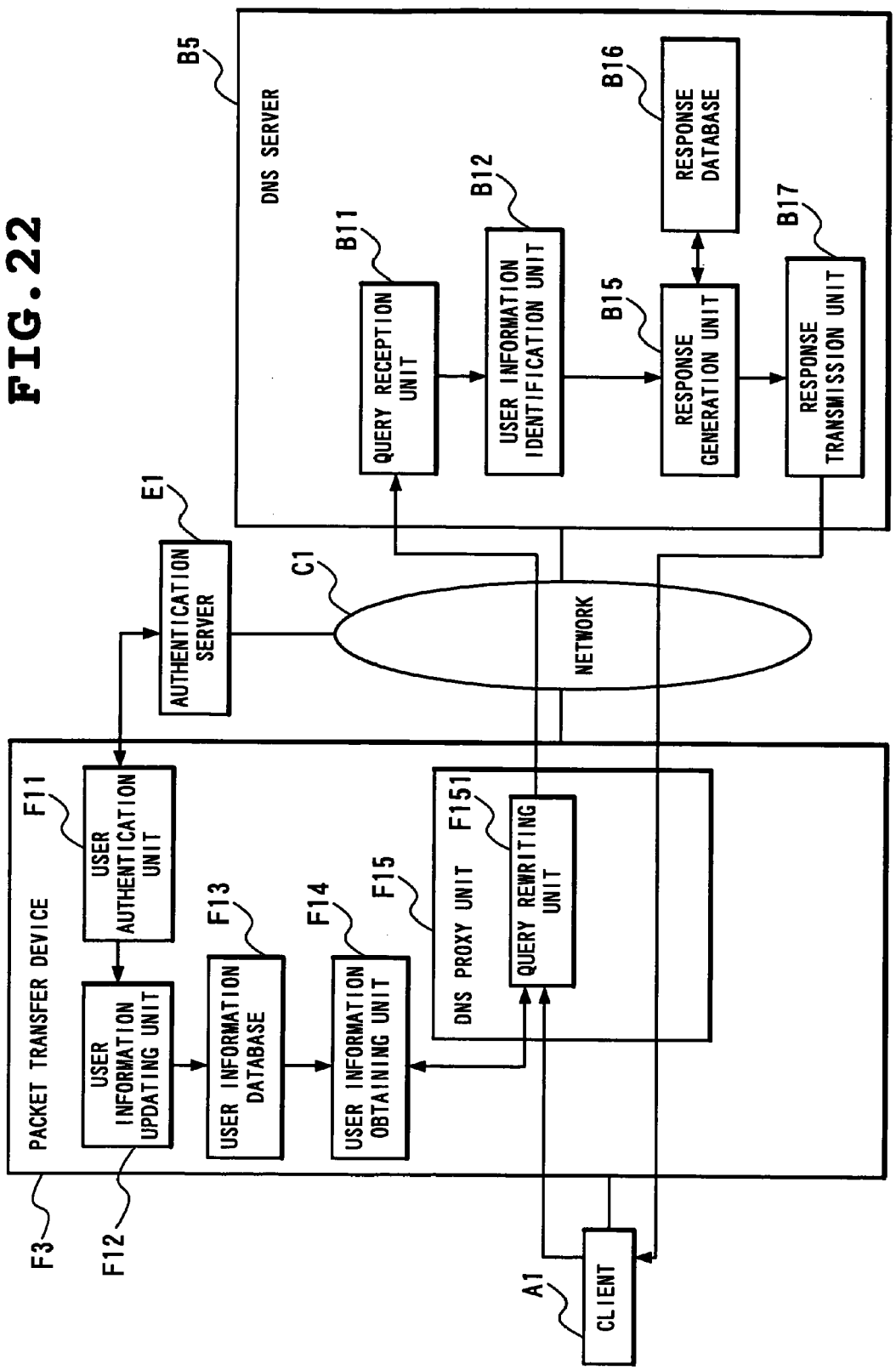
FIG. 22 is a block diagram showing another example of a structure according to the third embodiment of the present invention.

Example of a structure of a packet transfer device F3 in which the DNS proxy unit F15 has only the query rewriting unit F151 is shown in FIG. 22. In the case of the structure, the packet transfer device F3 embeds sender's user attribute information into a DNS query message received from the client A1 and transmits the obtained message to the DNS server B5, while transmitting a DNS response message returned from the DNS server B5 to the client A1 without processing.

Figure 23:
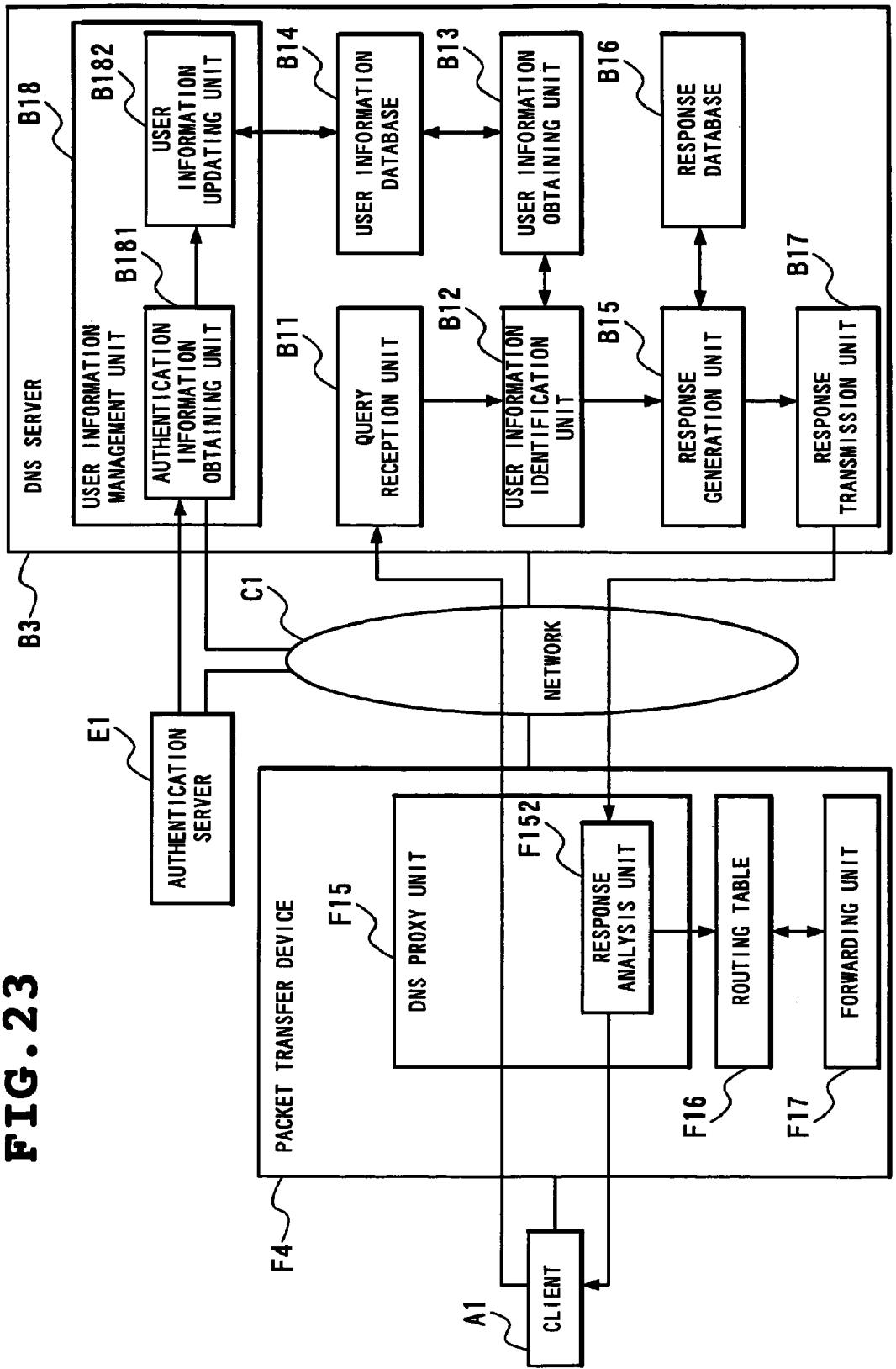
FIG. 23 is a block diagram showing a further example of a structure according to the third embodiment of the present invention.

Example of a structure of a packet transfer device F4 in which the DNS proxy unit F15 has only the response analysis unit F152 is shown in FIG. 23. In the case of the structure, the packet transfer device F4 transmits a DNS query message received from the client A1 to the DNS server B5 without processing, while extracting an embedded packet transfer method from a DNS response message returned from the DNS server B5 to generate an entry for the routing table.

Next, effects of the third embodiment will be described.

In the present embodiment, a DNS query message transmitted to the DNS server B5 by the client A1 is once received by the packet transfer device F1 on the way and user attribute information regarding a user which has transmitted the DNS query message in question is embedded into the DNS query message in question. At this time, attribute information regarding the packet transfer device F1 is also embedded as required as user attribute information and the obtained message is transferred to the DNS server B5. Furthermore, upon receiving the DNS query message in question, the DNS server B5 embeds, based on the user attribute information embedded in the DNS query message, a DNS response and a packet transfer method at the packet transfer device F1 corresponding to the response in question into a DNS response message and transmits the obtained message to the client A1. The packet transfer device F1 once receives the response message in question and extracts the packet transfer method embedded in the response message in question to generate an entry corresponding to the routing table F16.

While a DNS response message transmitted from a DNS server to a client is conventionally used by the client, the present embodiment enables not only a client but also a packet transfer device disposed between the client and the DNS server to use information stored in the DNS response message in question.

In the present embodiment, a transfer method at the packet transfer device F1 for a packet transmitted by the client as a result of the reception of the response message in question is embedded into the DNS response message in question. In a case of an application of Web, for example, this enables a DNS server to conduct such control of allowing the client A1 to connect to a Web server whose load is small, as well as allowing the packet transfer device F1 to preferentially transfer a packet passing on the connection between the client A1 and the Web server in question.

Moreover, the function of customizing a DNS response as described in the first embodiment of the present invention enables control of a transfer method at the packet transfer device F1 to be customized as well based on the user attribute information and attribute information regarding the packet transfer device F1. It is possible to conduct control such as preferentially transferring a packet sent or received by a preferential user or transferring using vlan for a preferential user.

Next, a first specific example of the present invention will be described with reference to the drawings. Such specific example corresponds to the first embodiment of the present invention. The present specific example is assumed to have the structure shown in FIG. 1. In the specific example, the client A1 is a terminal used by a user who requests name resolution from the DNS server B1. In addition, the DNS server B1 is assumed to hold the contents shown in FIG. 2 as the user information database B14 and hold the name resolution table 201 and the zone files 202 and 203 shown in FIG. 3 as the response database B16.

Assume now that a user 1 using a terminal whose IP address is ⌈123.45.0.2⌋ and a user 2 using a terminal whose IP address is ⌈123.45.0.4⌋ request name resolution of FQDN: www.aaa.com from the DNS server B1. Assume that www.aaa.com is an FQDN of a Web site presenting local area information and the Web site provides service, taking location information of a user who makes access (IP address of a connected NAS) and a kind of line connected to the network into consideration, for displaying Web pages appropriate for these user attribute information.

More specifically, from Kawasaki City to a user connected to the network (hereinafter assuming that a user connected to a NAS whose IP address is ⌈30.30.30.30⌋ is a user connected with Kawasaki City through the network), local area information of Kawasaki City is presented, while from Yokohama City to a user connected to the network (hereinafter assuming that a user connected to a NAS whose IP address is ⌈20.20.20.20⌋ is a user connected with Yokohama City through the network), local area information of Yokohama City is presented.

To a user connected through an ADSL, local area information is displayed on a Web page which mainly presents multimedia contents suitable for wide band access, while to a user connected to the network through an ISDN line, the information is displayed on a Web page which mainly presents text-based contents suitable for narrow band access. With these Web pages hosted by different Web servers, assume hereinafter that a Web page for users connected to the network of Kawasaki City through an ADSL is hosted by a Web server whose IP-address is ⌈9.8.7.6⌋ and a Web page for users connected to the network of Yokohama City through an ISDN line is hosted by a Web server whose IP address is ⌈9.8.7.3⌋.

First, the user 1 and the user 2 transmit a DNS query message to the DNS server B1 through their using terminals. The query reception unit B11 of the DNS server B1 hands over the received DNS query message to the user information identification unit B12. Since no user attribute information is embedded into the DNS query message, the user information identification unit B12 hands over the DNS query message to the user information obtaining unit B13. The user information obtaining unit B13 first examines a source IP address of the received DNS query message. In this case, the source IP address of the DNS query message transmitted by the user 1 is ⌈123.45.0.2⌋ and the source IP address of the DNS query message transmitted by the user 2 is ⌈123.45.0.4⌋.

Next, based on the source IP addresses, search the user information database B14 for entries relevant to the user 1 and the user 2. In this case, an entry relevant to the user 1 is the first entry of the user information database B14 shown in FIG. 2, from which obtained is attribute information of the user 1 that a log-in ID is [taro], a connection line is an ADSL line and an IP address of a connected NAS is [30.30.30.30].

An entry relevant to the user 2 is the second entry of the user information database B14, from which obtained is attribute information of the user 2 that a log-in ID is [hanako], an IP address is [123.45.0.4] and an IP address of a connected NAS is [20.20.20.20]. Furthermore, it can be found that referring to a node whose IP address is [8.9.1.4] obtains other attribute information. Here, assume that the user information obtaining unit B13 refers to the node whose IP address is [8.9.1.4] to obtain further information that a connection line is an ISDN line as the attribute information of the user 2.

The user information obtaining unit B13 hands over thus obtained attribute information of the user 1 and the user 2 to the user information identification unit B12 and the user information identification unit B12 hands over, to the response generation unit B15, the attribute information of the user 1 and the user 2 and the DNS query message transmitted by the user 1 and the user 2 which is handed over from the query reception unit B11. The response generation unit B15 searches the response database B16 for the user attribute information and an entry relevant to an inquired FQDN.

In this case, found as an entry relevant to the DNS query from the user 1 is a first entry of the name resolution table 201 shown in FIG. 3 and further found as a name resolution method is a first entry of the zone file 202. As a result, for the DNS query for FQDN: www.aaa.com from the user 1, name resolution obtains the IP address [9.8.7.6].

In addition, a second entry of the name resolution table 201 is found as an entry relevant to the DNS query message from the user 2 and a first entry of the zone file 203 is found as a name resolution method. As a result, for the DNS query for FQDN:www.aaa.com from the user 2, the IP address [9.8.7.3] is obtained in the name resolution.

The response generation unit B17 hands over the name resolution result to the response transmission unit B17. The response transmission unit B17 embeds the received name resolution result into a DNS response message and transmits the obtained message to the user 1 and the user 2.

Upon receiving the DNS response message from the DNS server B1, the user 1 will access a Web server whose IP address is [9.8.7.6]. As described in the foregoing, since a Web page suitable for a user connected to Kawasaki City through the network by using the ADSL is hosted in the Web server whose IP address is [9.8.7.6], a Web page appropriate for the attributes of the user 1 will be displayed for the user 1.

Similarly, upon receiving the DNS response message from the DNS server B1, the user 2 will access a Web server whose IP address is [9.8.7.3]. As described in the foregoing, since a Web page suitable for a user connected to Kawasaki City through the network by using the ISDN is hosted in the Web server whose IP address is [9.8.7.3], a Web page appropriate for the attributes of the user 2 will be displayed for the user 2.

Next, a second specific example will be described with reference to the drawings. The specific example corresponds to the second embodiment and is assumed to have the structure shown in FIG. 9. In the present specific example, assume that the authentication server E1 is a RADIUS server and is used for user authentication and charging processing of a user who logs in to a network operated by an ISP. Also assume that the client A1 is a user terminal of a user who logs in to the above-described network operated by the ISP and the user requests name resolution from the DNS server B3 by using the client A1.

Assume that the user now logs in to the network operated by the ISP. As shown in FIG. 9, when the user logs in, the authentication server E1 receives an Accounting Request message from the RADIUS client and transfers the received Accounting Request message to the DNS server B3 by using the Proxy function. Assume here that in the Accounting Request message, as shown in FIG. 9, described as user attribute information are a user's log-in ID of taro, an IP address of a connected NAS being 30.30.30.30, an IP address of the user's using terminal (client A1) being 123.45.0.2 and a connection line being ADSL and also described is that the user has logged in to the network.

Upon receiving the Accounting Request message, the authentication information obtaining unit B181 of the user information management unit B18 hands over the message to the user information management unit B182. In this case, since the Accounting Request message has the description that the user has logged in to the network, the user information management unit B182 registers the user attribute information described in the Accounting Request message at the user information database B14. As a result, the first entry of the user information database illustrated in FIG. 2, for example, is added to the user information database B14. Operation executed when the user requests name resolution from the DNS server B1 after log-in to the network is the same as that of the above-described first specific example.

Next, a third specific example will be described with reference to the drawings. The specific example corresponds to the third embodiment of the present invention and is assumed to have the structure shown in FIG. 14. In the present specific example, assume that the client A1 is a terminal used by a user who requests name resolution from the DNS server B5. Also assume that the DNS server B5 holds the response database B16 as the name resolution table 401 and the zone files 402 and 403 and that the packet transfer device F1 has a NAT (Network Address Translation) function and holds the contents shown in FIG. 16 as the user information database F13. Further assume that an identifier (ID) of the packet transfer device F1 is [switch99].

Assume here that each of the user 1 who uses a terminal whose MAC address is [00:12:34:56:78:9a] and which is connected to a port [02] of the packet transfer device F1 through a vlan whose vlan ID is [100] and the user 2 who uses a terminal whose MAC address is [00:bc:de:f0:12:34] and which is connected to a port [11] of the packet transfer device F1 through a vlan whose vlan ID is [200] accesses a Web site having URL of http://www.ddd.com/index.html.

First, the client A1 corresponding to the terminal used by the user 1 or the user 2 transmits a DNS query message to the DNS server B5 in order to make a solution of an IP address corresponding to FQDN:www.ddd.com. When the DNS query message passes through the packet transfer device F1, the packet transfer device F1 hands over a packet matching the destination port number (53) of the DNS message to the query rewriting unit F151 in the DNS proxy unit F15. The query rewriting unit F151 obtains user attribute information corresponding to a sender of the query message in question from the user information database F13 through the user information obtaining unit F14.

In a case of the user 1, the information matches the first entry of the user information database 501 and in a case of the user 2, the same matches the second entry. The query rewriting unit F151 embeds the obtained user attribute information and the ID of the packet transfer device F1 (rswtich99]) into an additional information part of the received DNS query message and transfers the obtained message to the DNS server B5.

Upon receiving the DNS query message with the user attribute information embedded, the DNS server B5 identifies the user attribute information embedded in the DNS query message in question by means of the user information identification unit B12 and searches for an entry corresponding to the user attribute information in question and the contents of the query by means of the response generation unit B15. In a case of a DNS query message from the user 1, the information matches the first entry of the name resolution table 401 in the response database B16 and the information as the name resolution method matches the first entry of the zone file 402.

As a result, in a DNS response message responsive to the DNS query message for FQDN:www.ddd.com from the user 1, an IP address of 20.1.1.1 is inserted into a response part and rSrcIPAddr=40.1.1.1, vlanID=111, outport=21, priority=0] as a transfer method at the packet transfer device F1 for the corresponding packet is inserted into an additional information part. In a case of the DNS query message of the user 2, the information matches the third entry of the name resolution table 401 and the information as the name resolution method matches the first entry of the zone file 403.

As a result, in a DNS response message responsive to the DNS query message for FQDN:www.ddd.com from the user 2, an IP address of [60.1.1.1] is inserted into a response part and rSrcIPAddr=40.1.1.1, DestIPAddr=90.1.1.1, vlanID=333, outport=31, priority=1] as a transfer method at the packet transfer device F1 for the corresponding packet is inserted into an additional information part. The DNS response message generated in the response generation unit B15 is transmitted to the client A1 (user 1 or user 2) by the response transmission unit B17.

The DNS response message transmitted from the DNS server B5 to the client A1 passes through the packet transfer device F1 on its way. When the response message in question passes through the packet transfer device F1, the packet transfer device F1 hands over a packet matching the source port number (53) of the DNS message to the response analysis unit F152 in the DNS proxy unit F15. The response analysis unit F152 analyzes the information contained in the response message and generates an entry in the routing table F16 based on the information in question.

In a case of the DNS response message to the user 1, the first entry in the example of contents shown in. FIG. 17 is generated in the routing table F16 based on the information contained in the response part and the additional information part of the response message in question. In a case of the DNS response message to the user 2, the second entry in the example of contents shown in FIG. 17 is generated in the routing table F16 based on the information contained in the response part and the additional information part of the response message in question.

When the entries to the routing table F16 are generated, the response analysis unit F152 deletes the additional information part field in the received DNS response message and transfers the obtained message to the client A1.

Upon receiving the DNS response message corresponding to the transmitted DNS query message, the client A1 establishes an HTTP connection for the IP address of www.ddd.com responded by the response message in question to conduct request processing or the like on the connection. In a case of the user 1, establish an HTTP connection for the IP address [20.1.1.1], while in a case of the user 2, establish an HTTP connection for the IP address [60.1.1.1]. All the packets flowing on these connections pass through the packet transfer device F1.

At this time, as to the packets flowing on the connection between the user 1 and the IP address [20.1.1.1], a transfer method based on the first entry in the routing table 601 shown in FIG. 17 is applied, while as to the packets flowing on the connection between the user 2 and the IP address [60.1.1.1], a transfer method based on the second entry in the routing table F16 is applied.

For example, since a packet transmitted by the user 1 has [ordinary] as transfer priority in the routing table F16, transfer is made at ordinary priority, while since a packet transmitted by the user 2 has [high priority] as transfer priority, transfer is made at higher priority than a packet transferred at ordinary transfer priority. In other words, the user 2 is expected to have smoother Web connection than the user 1.

The present specific example makes it clear that using the DNS server B5 and the packet transfer device F1 enables not only a function of solution from an FQDN to an IP address provided by a conventional DNS server but also a packet transfer method at the packet transfer device F1 through which a packet transmitted by the client A1 passes to be simultaneously controlled.

In the DNS server and the packet transfer device of the present invention, the function of each device as a component can be realized not only by hardware but also by loading a name resolution program (application) for executing the function of each of the above-described devices to conduct name resolution processing into a memory of a computer processing device which realizes the DNS server and by executing the program. In other words, the functions of the above-described DNS server and packet transfer device can be realized by software. The name resolution program is stored in a magnetic disk, a semiconductor memory or other recording medium and loaded into a computer processing unit from the recording medium to control operation of the computer processing unit, thereby realizing the above-described respective functions.

Although the present invention has been described with respect to the preferred embodiments and specific examples in the foregoing, the present invention is not limited to the above-described embodiments and specific examples and can be implemented in various forms within its technical idea.

As described in the foregoing, the present invention attains the following effects.

First effect is flexibly customizing a name resolution response at a name resolution server based on arbitrary attribute information of a sender (user) of a name resolution request message without changing a resolver at a client.

The reason is that with a user information database storing user attribute information being held by the first name resolution server of the present invention, referring to the database at the reception of a name resolution request message enables name resolution processing to be customized taking the user attribute information into consideration.

Second effect is allowing a name resolution server to automatically generate and manage a database containing user attribute information regarding a sender of a name resolution request message which information is for use in customizing a name resolution response.

The reason is that the second name resolution server of the present invention cooperates with an authentication server to dynamically obtain the relevant user attribute information from the authentication server in question and automatically register and delete the user attribute information in question at/from the data abase in question.

Third effect is allowing not only a client but also a packet transfer device disposed between the client and a DNS server to use information contained in a name resolution response message transmitted by a name resolution server to the client The reason is that at the time when the name resolution server of the present invention transmits a name resolution response message to the client, the message is transmitted with an ordinary name resolution response and a packet transfer method at the packet transfer device of the present invention corresponding the response embedded together and the packet transfer device of the present invention once receives the response message before the response message in question arrives at the client and extracts the packet transfer method embedded into the response message in question to generate an entry corresponding to a routing table in its own node.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A packet transfer device for controlling a transfer of a plurality of packets between a client and a destination, said packet transfer device comprising:
   a DNS proxy unit for receiving a name resolution response message transmitted from a name resolution server to said client, said name resolution response message including an IP address corresponding to said destination and one or more packet transfer information fields, and for rewriting a routing table of said DNS proxy unit to include said IP address and said one or more packet transfer information fields,
   wherein said DNS proxy unit is configured to control said transfer of the packets between said client and said destination according to said one or more packet transfer information fields,
   wherein said one or more packet transfer information fields include at least one of a packet transfer priority field, a logical network identifier, and a logical channel identifier,
   wherein said one or more packet transfer information fields include the packet transfer priority field,
   wherein the packet transfer device further comprises a user information obtaining unit which obtains attribute information regarding a sender of a name resolution request message transmitted from said client to said name resolution server,
   wherein the attribute information is obtained based on a user information database in which attribute information for a user is registered, the attribute information comprising a log-in ID, IP address, and reference destination,
   wherein said DNS proxy unit, upon receiving said name resolution request message, obtains said attribute information regarding the sender of said name resolution request message through said user information obtaining unit and transmits said name resolution request message with said attribute information added to said name resolution server, and wherein said attribute information includes at least one of a login identifier of the sender, information identifying a geographic location of the sender, information identifying a type of a sender device used by the sender in sending the name resolution request message, and information identifying a type of a network coupling the sender device to the name resolution server,
   wherein the packet transfer device comprises at least a processor.

2. The packet transfer device as set forth in claim 1, wherein
   in response to said name resolution response message, said DNS proxy unit deletes said one or more packet transfer information fields from said name resolution response message before transmitting said name resolution response message to said client.

3. The packet transfer device as set forth in claim 1, further comprising,
   as an internal element, a user information database in which said attribute information is stored, wherein
   said user information obtaining unit obtains said attribute information from said user information database.

4. The packet transfer device as set forth in claim 1, wherein
   said user information obtaining unit obtains said attribute information from an external database server having a user information database in which said attribute information is stored.

5. The packet transfer device as set forth in claim 4, wherein
   said user information obtaining unit uses a name resolution request message in obtaining said attribute information from said external database server.

6. The packet transfer device as set forth in claim 4, wherein
   said external database server is a name resolution server externally disposed.

7. The packet transfer device as set forth in claim 3, further comprising:
   a user authentication unit which identifies and authenticates a user based on the attribute information, and
   a user information updating unit which updates the contents of said user information database based on attribute information regarding said user obtained at the time of authentication.

8. A non-transitory computer-readable storage medium storing computer-readable instructions, said computer-readable instructions configured to cause a computing device to:
   perform a proxy function of receiving a name resolution response message transmitted from a name resolution server to a client, said name resolution response message including an IP address according to a destination and one or more packet transfer information fields, and rewriting a routing table to include said IP address and said one or more packet transfer information fields; and
   control a transfer of a plurality of packets between said client and said destination according to said one or more packet transfer information fields,
   wherein said one or more packet transfer information fields include at least one of a packet transfer priority field, a logical network identifier, and a logical channel identifier,
   wherein said one or more packet transfer information fields include the packet transfer priority field,
   wherein said computer-readable instructions are further configured to cause the computing device to obtain attribute information regarding a sender of a name resolution request message transmitted from said client to said name resolution server and to transmit said name resolution request message with said attribute information added to said name resolution server, wherein the attribute information is obtained based on a user information database in which attribute information for a user is registered, the attribute information comprising a log-in ID, IP address, and a reference destination, wherein said attribute information includes at least one of a login identifier of the sender, information indicating a geographic location of the sender, information indicating a type of a sender device used by the sender in sending the name resolution request message, and information indicating a type of a network coupling the sender device to the name resolution server.

9. The computer-readable storage medium as set forth in claim 8, wherein said computer-readable instructions are further configured to cause the computing device to:

in response to said name resolution response message delete said one or more packet transfer information fields from said name resolution response message; and transmit said name resolution response message to said client.

10. A packet transfer method of transferring a plurality of packets between a client and a destination, wherein the client comprises at least a processor, said method comprising:

receiving a name resolution response message transmitted from a name resolution server to said client, said name resolution response message including an IP address corresponding to said destination and one or more packet transfer information fields;

rewriting a routing table to include said IP address and said one or more packet transfer information fields; and controlling said transfer of said packets between said client and said destination according to said IP address and said one or more packet transfer information fields, wherein said one or more packet transfer information fields include at least one of a packet transfer priority field, a logical network identifier, and a logical channel identifier, wherein said one or more packet transfer information fields include the packet transfer priority field, wherein said method further comprises:

obtaining attribute information regarding a sender of a name resolution request message transmitted from said client to said name resolution server;

wherein the attribute information is obtained based on a user information database in which attribute information for a user is registered, the attribute information comprising a log-in ID, IP address, and reference destination; and transmitting said name resolution request message with said attribute information added to said name resolution server, and wherein said attribute information includes at least one of a login identifier of the sender, information indicating a geographic location of the sender, information indicating a type of a sender device used by the sender in sending the name resolution request message, and information indicating a type of a network coupling the sender device to the name resolution server.

* * * * *